(12) United States Patent
Endo et al.

(10) Patent No.: US 10,353,695 B2
(45) Date of Patent: Jul. 16, 2019

(54) SOFTWARE MANAGEMENT SYSTEM FOR VEHICLE, MANAGEMENT SERVER, AND VEHICLE

(71) Applicant: TOYOTA JIDOSHA KABUSHIKI KAISHA, Toyota-shi, Aichi-ken (JP)

(72) Inventors: Masato Endo, Nagakute (JP); Takashi Kojima, Seto (JP); Shintaro Iwaasa, Toyota (JP); Naoki Yamamuro, Nagoya (JP); Daishi Terato, Nagoya (JP); Masakazu Nomura, Nagoya (JP); Shinichiro Fujii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/449,341

(22) Filed: Mar. 3, 2017

(65) Prior Publication Data
US 2017/0262277 A1  Sep. 14, 2017

(30) Foreign Application Priority Data
Mar. 14, 2016  (JP) .................. 2016-049894

(51) Int. Cl.
| | |
|---|---|
| *G06F 8/65* | (2018.01) |
| *G06F 8/71* | (2018.01) |
| *G06F 8/658* | (2018.01) |
| *H04L 29/06* | (2006.01) |
| *H04L 29/08* | (2006.01) |
| *G06F 9/44* | (2018.01) |

(52) U.S. Cl.
CPC .............. *G06F 8/658* (2018.02); *G06F 8/65* (2013.01); *G06F 8/71* (2013.01); *H04L 63/10* (2013.01); *H04L 67/04* (2013.01); *H04L 67/12* (2013.01); *H04L 67/34* (2013.01); *Y04S 40/18* (2018.05)

(58) Field of Classification Search
CPC ............. G06F 8/658; G06F 8/71; H04L 67/12
USPC ......................................... 717/171
See application file for complete search history.

(56) References Cited

U.S. PATENT DOCUMENTS

| | | | |
|---|---|---|---|
| 2003/0110482 A1* | 6/2003 | Ferguson | G06F 8/65 717/168 |
| 2007/0220242 A1* | 9/2007 | Suzuki | G06F 8/65 713/1 |
| 2014/0156134 A1* | 6/2014 | Cullinane | B60W 30/00 701/23 |

FOREIGN PATENT DOCUMENTS

| | | |
|---|---|---|
| JP | 2008-009493 A | 1/2008 |
| JP | 2008-186147 A | 8/2008 |
| JP | 2009-102003 A | 5/2009 |

(Continued)

Primary Examiner — Ryan D. Coyer
(74) Attorney, Agent, or Firm — Oliff PLC

(57) ABSTRACT

A software management system for a vehicle, including a vehicle and a management server, includes: an update necessity determination portion configured to determine whether or not an update is required in terms of software installed in the vehicle and related to a driving support function; and a restriction portion configured to turn on a control flag of the driving support function when it is determined that the update is required, and also configured to turn off the control flag when the update is permitted by a user and the software related to the driving support function is updated. The software management system starts to restrict an operation of the driving support function at a predetermined timing while the control flag is in an ON state, and resets the restriction at a timing when the control flag is turned off.

11 Claims, 24 Drawing Sheets

(56) References Cited

FOREIGN PATENT DOCUMENTS

| | | |
|---|---|---|
| JP | 2010-211543 A | 9/2010 |
| JP | 2013-037474 A | 2/2013 |

* cited by examiner

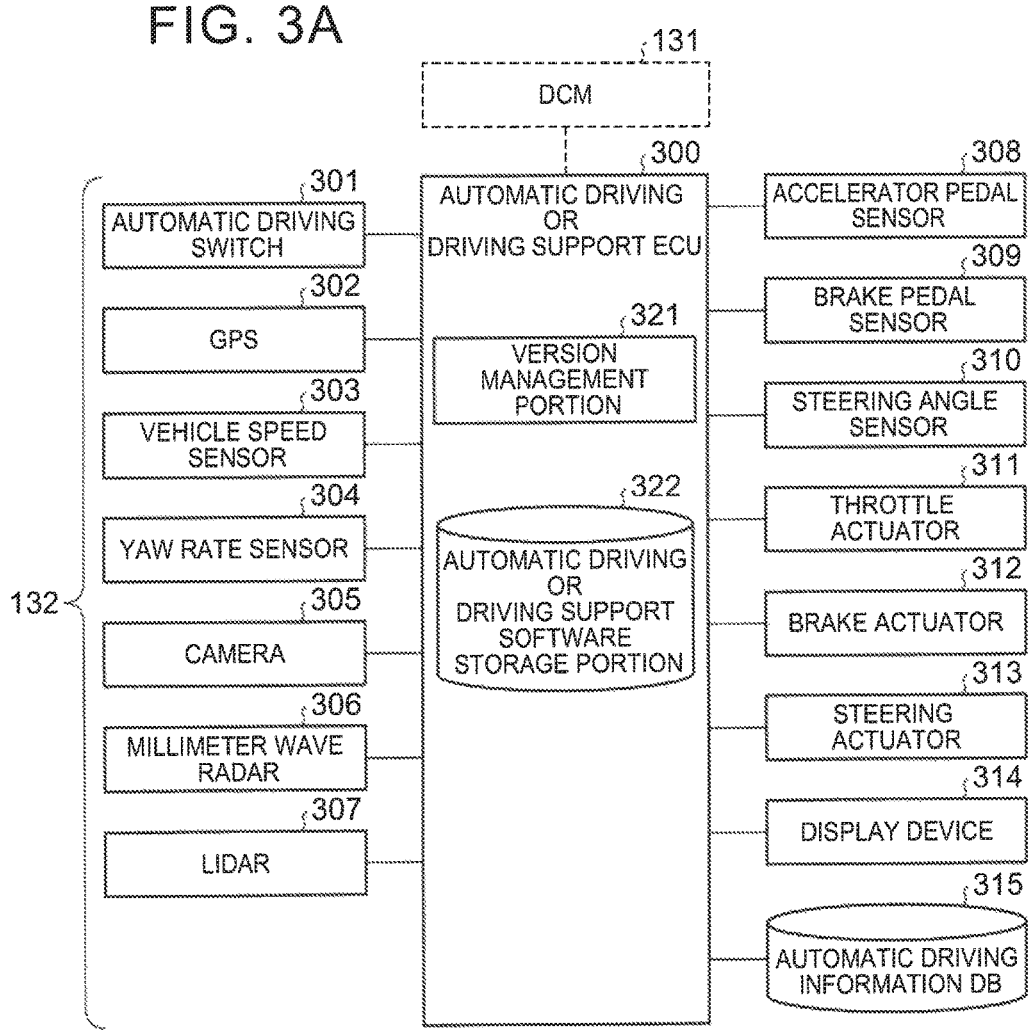
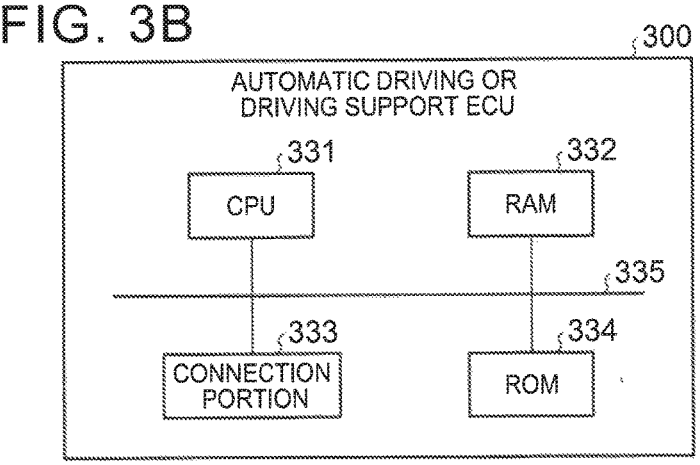

FIG. 4A

SOFTWARE INFORMATION 400

| SOFTWARE ID | SOFTWARE NAME | CREATOR | DATE OF CREATION | Ver | NECESSITY OF PERMISSION |
|---|---|---|---|---|---|
| S/W101 | | | 2015.9.15 | 1.3.1 | YES |
| S/W203 | | | 2015.9.15 | 2.1 | YES |
| S/W301 | | | 2015.9.15 | 1.5 | NO |
| S/W551 | | | 2015.9.15 | 3.2.1 | NO |

FIG. 4B

USER INFORMATION 410

| VEHICLE ID | VEHICLE NUMBER | DCM | USER ATTRIBUTE | | | | | PORTABLE TERMINAL | UPDATE STATUS OF SOFTWARE | | | | FUNCTION RESTRICTION |
|---|---|---|---|---|---|---|---|---|---|---|---|---|---|
| | | | NAME | SEX | AGE | ADDRESS | ... | | S/W101 | S/W203 | S/W301 | ... | |
| C1 | ... | αα | DD | F | 40 | ... | ... | M1 | 1.3.1 COMPLETED | | | ... | — |
| C2 | ... | ββ | EE | M | 35 | ... | ... | M2 | 1.3.0 NOT PERMITTED | 2.1 COMPLETED | | ... | INSTRUCTED |
| C3 | ... | γγ | FF | F | 30 | ... | ... | M3 | | 2.0 PERMITTED | 1.5 COMPLETED | ... | — |

FIG. 5A

DRIVING SUPPORT SOFTWARE INFORMATION (VEHICLE ID=C1) ⟨510

| SOFTWARE ID | SOFTWARE NAME | CREATOR | DATE OF CREATION | Ver | FUNCTION RESTRICTION FLAG |
|---|---|---|---|---|---|
| S/W101 | | | 2015.9.15 | 1.3.1 | OFF |

FIG. 5B

DRIVING SUPPORT SOFTWARE INFORMATION (VEHICLE ID=C2) ⟨520

| SOFTWARE ID | SOFTWARE NAME | CREATOR | DATE OF CREATION | Ver | FUNCTION RESTRICTION FLAG |
|---|---|---|---|---|---|
| S/W101 | | | 2015.6.22 | 1.3.0 | ON |
| S/W203 | | | 2015.2.5 | 2.1 | OFF |

FIG. 5C

DRIVING SUPPORT SOFTWARE INFORMATION (VEHICLE ID=C3) ⟨530

| SOFTWARE ID | SOFTWARE NAME | CREATOR | DATE OF CREATION | Ver | FUNCTION RESTRICTION FLAG |
|---|---|---|---|---|---|
| S/W203 | | | 2015.9.15 | 2.0 | OFF |
| S/W301 | | | 2015.4.11 | 1.5 | - |

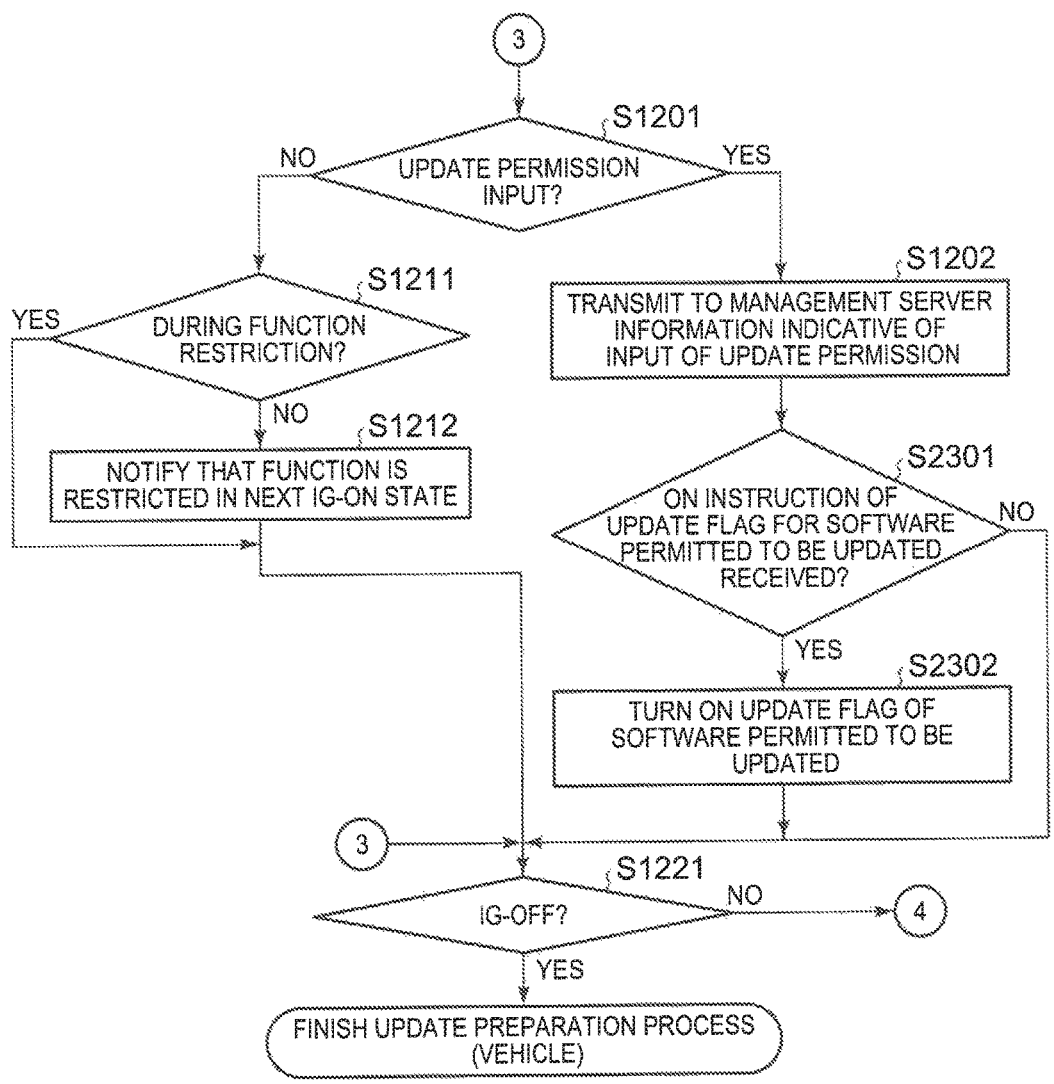

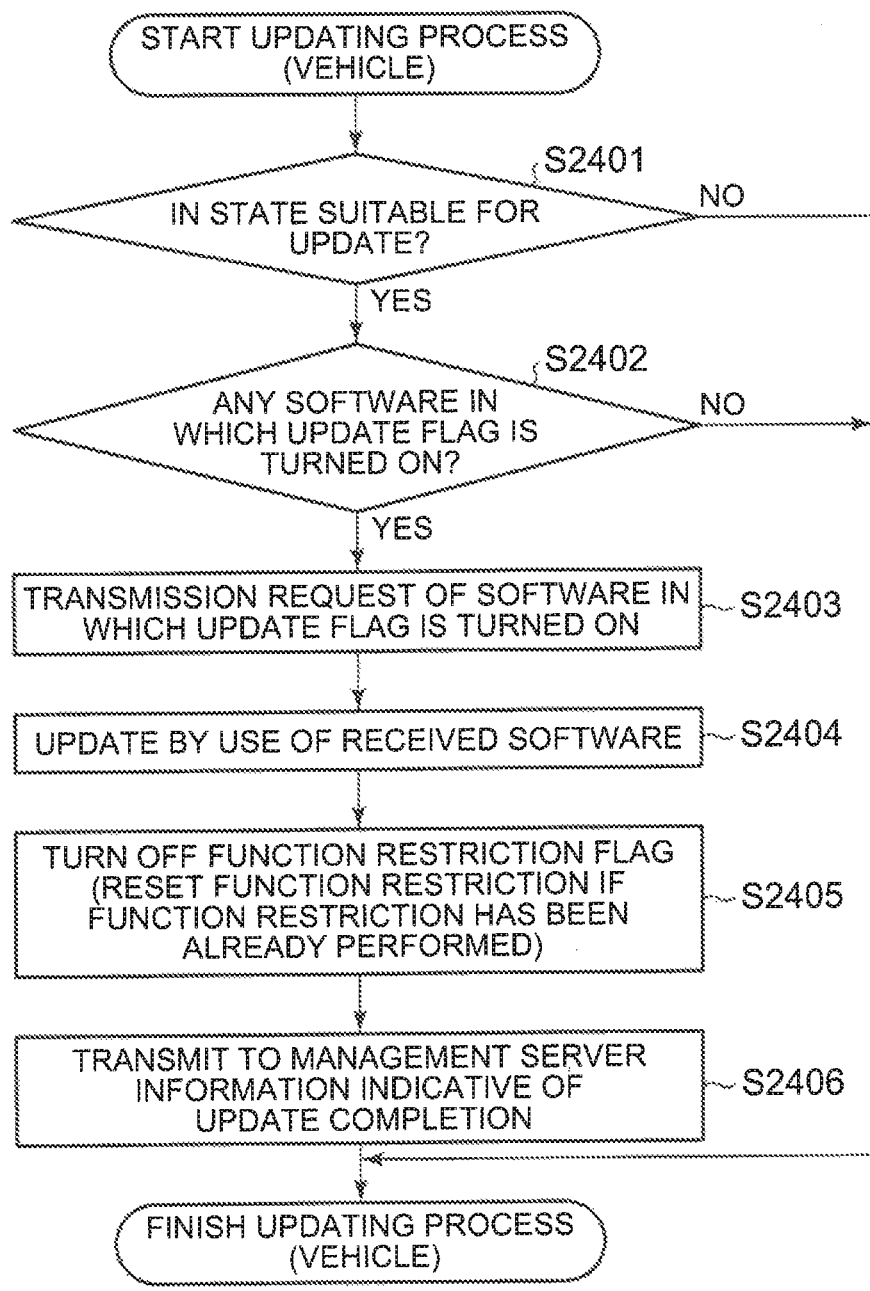

SOFTWARE MANAGEMENT SYSTEM FOR VEHICLE, MANAGEMENT SERVER, AND VEHICLE

INCORPORATION BY REFERENCE

The disclosure of Japanese Patent Application No. 2016-049894 filed on Mar. 14, 2016 including the specification, drawings and abstract is incorporated herein by reference in its entirety.

BACKGROUND

1. Technical Field

The present disclosure relates to a software management system for a vehicle, a management server, and a vehicle.

2. Description of Related Art

There has been known a software management system for a vehicle, which includes a vehicle including a communications device such as DCM (Data Communication Module), and a management server connected to the vehicle via the communications device and configured to be able to update software installed in the vehicle.

In the software management system for the vehicle, when the management server acquires latest software (software of a latest version for the software installed in the vehicle), it is determined that an update to the latest software is required, and the management server transmits the latest software to the vehicle. Hereby, according to the software management system for the vehicle, the vehicle can acquire the latest software appropriately.

SUMMARY

However, as for software related to an automatic driving function, a driving support function, or the like among the software installed in the vehicle, a permission of a user of the vehicle is required at the time of an update to its latest software. On this account, if the user neglects a permission operation, the software related to the automatic driving function, the driving support function, or the like continues being used as an old version by the user.

On this account, it is desirable that the software management system for the vehicle be configured to give an incentive to the user who actively performs a permission operation at the time of the update to the latest software, so as to realize an early update to the latest software.

In view of this, this disclosure relates to a software management system that can update software installed in a vehicle and related to an automatic driving function or a driving support function, and realizes an early update when it is necessary to update the software.

According to one aspect of the disclosure, a software management system for a vehicle includes the following configuration. That is, a software management system for a vehicle having an automatic driving function or a driving support function, includes a management server that manages software installed in the vehicle, and the software management system includes: an update necessity determination portion configured to determine whether or not an update is required in terms of software installed in the vehicle and related to the automatic driving function or the driving support function; an update portion configured to update the software related to the automatic driving function or the driving support function when the update necessity determination portion determines that the update is required and the update is permitted by a user; and a restriction portion configured to turn on a control flag when the update necessity determination portion determines that the update is required, the control flag enabling a restriction on an operation of part or all of the automatic driving function or the driving support function, the restricting portion being configured to turn off the control flag when the update portion updates the software related to the automatic driving function or the driving support function, wherein the restriction portion starts to restrict the operation of part or all of the automatic driving function or the driving support function at a predetermined timing while the control flag is in an ON state, and the restriction portion resets the restriction at a timing when the control flag is turned off.

According to the above software management system for the vehicle, the update necessity determination portion determines whether or not an update is required in terms of the software installed in the vehicle and related to the automatic driving function or the driving support function. Further, according to the software management system for the vehicle, the update portion may update the software related to the automatic driving function or the driving support function when the update necessity determination portion determines that the update is required and the update is permitted by the user.

Hereby, in the software management system for the vehicle, when the update is required in terms of the software installed in the vehicle and related to the automatic driving function or the driving support function, the update can be performed if the user permits the update.

The software management system for the vehicle may include a notification portion configured to notify the user to permit the update when the update necessity determination portion determines that the update is required.

Further, in the software management system for the vehicle, when the update necessity determination portion determines that the update is required, the restriction portion turns on the control flag enabling a restriction on the operation of part or all of the automatic driving function or the driving support function. Further, when the update portion updates the software related to the automatic driving function or the driving support function, the restriction portion turns off the control flag. Further, the restriction portion may start to restrict the operation of part or all of the automatic driving function or the driving support function at a predetermined timing while the control flag is in an ON state, and the restriction portion may reset the restriction at a timing when the control flag is turned off.

Hereby, if the user does not perform a permission operation early for the update of the software related to the automatic driving function or the driving support function, the operation of part or all of the automatic driving function or the driving support function is restricted in the vehicle. In other words, when the user performs the permission operation for the update early so as to complete the update, it is possible to avoid such a situation that the operation of part or all of the automatic driving function or the driving support function is restricted in the vehicle (or it is possible to shorten a time during which the operation is restricted), so that an incentive can be obtained by actively performing the permission operation.

As a result, according to the above software management system for the vehicle, the permission operation is performed by the user early, and in a case where the update is required in terms of the software related to the automatic driving function or the driving support function, an early update can be realized.

The software management system for the vehicle may be configured such that the restriction on the operation of part or all of the automatic driving function or the driving support function is started at a timing when the control flag is turned on with the vehicle being in an IG-ON state.

The software management system for the vehicle may be configured such that the restriction on the operation of part or all of the automatic driving function or the driving support function is started at a timing when the vehicle stops after the control flag is turned on.

According to this disclosure, in a software management system that can update software installed in a vehicle and related to an automatic driving function or a driving support function, it is possible to realize an early update when it is necessary to update the software.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A is a view illustrating an example of a hardware configuration of an automatic driving or driving support system;

FIG. 3B is a view illustrating an example of a hardware configuration of an automatic driving or driving support ECU;

FIG. 4A is a view illustrating an example of software information;

FIG. 4B is a view illustrating an example of user information;

FIG. 5A is a view illustrating an example of driving support software information;

FIG. 5B is a view illustrating an example of the driving support software information;

FIG. 5C is a view illustrating an example of the driving support software information;

FIG. 23 is a flowchart illustrating a flow of the update preparation process in the vehicle; and FIG. 24 is a flowchart illustrating a flow of an updating process in the vehicle.

DETAILED DESCRIPTION OF EMBODIMENTS

Figure 1:
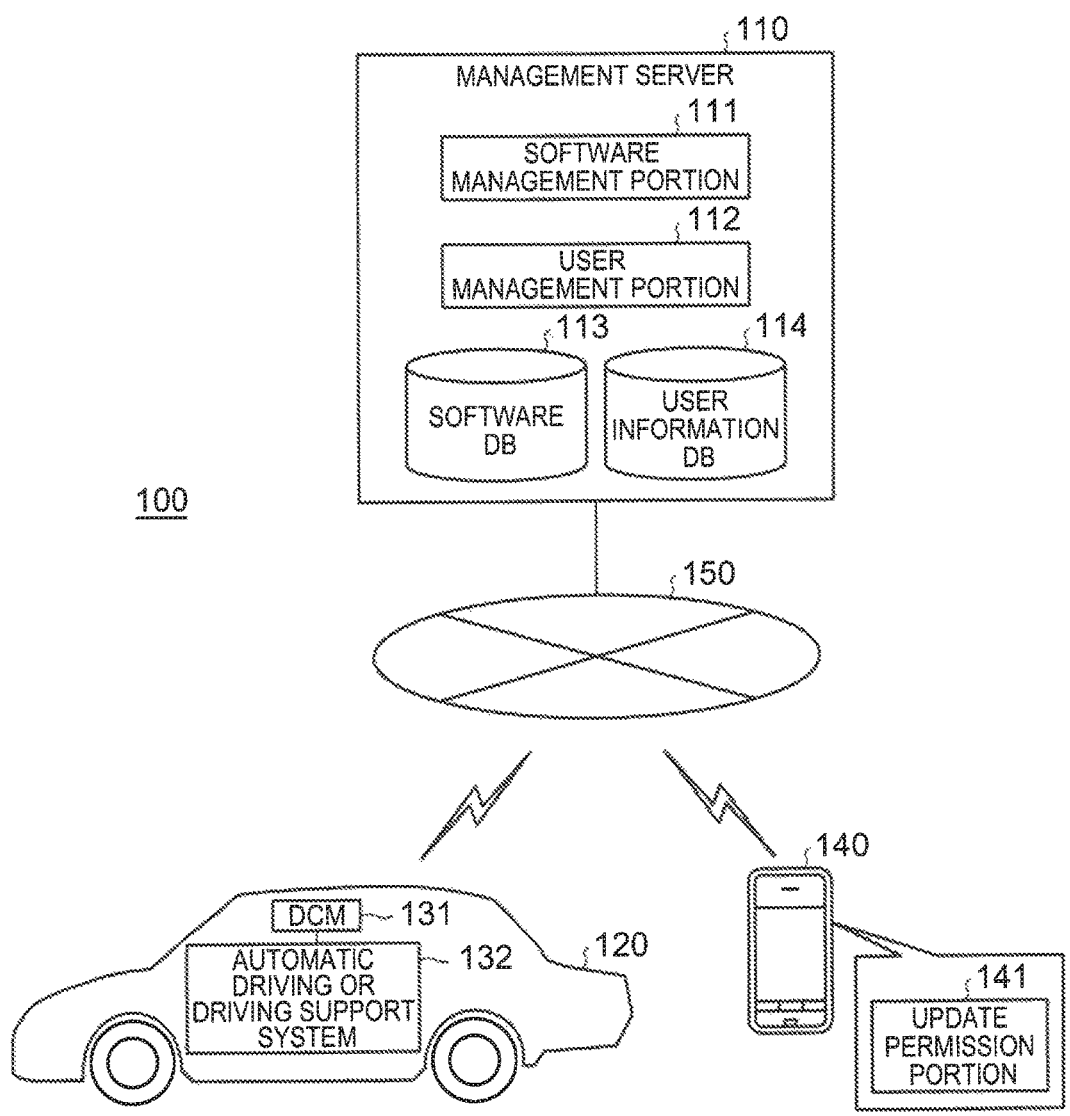
FIG. 1 is a view illustrating an example of a software management system for a vehicle.

Embodiments of the present disclosure are described below with reference to attached drawings. Note that, in the present specification and the drawings, constituents having substantially the same functional configuration have the same reference sign, so that redundant descriptions are omitted. Further, among the terms used in the present specification and the drawing, an "automatic driving function" and a "driving support function" shall refer to respective functions to implement the following levels. "Automatic Driving Function:"—A level to wholly perform a driving operation of a vehicle and surrounding monitoring.—A level in which, only when the function reaches its limit, a driver performs the driving operation by himself/herself, but in other cases, the automatic driving function wholly performs the driving operation of the vehicle and the surrounding monitoring. "Driving Support Function:"—A level to wholly perform a driving support to steering, braking, and acceleration, although a driver takes responsibility for a safe driving.—A level to perform not all the driving support to steering, braking, and acceleration, although the driving support to steering, braking, or acceleration is performed.—A level to perform a support to forward collision warning, other than steering, braking, and acceleration, while the driver performs the driving operation for steering, braking, and acceleration of the vehicle. Note that functions such as ACC (Adaptive Cruise Control), LKA (Lane Keeping Assist System), IPA (Intelligent Parking Assist), and the like are included in the "driving support function."

[First Embodiment]<1. Overall Configuration of Software Management System for Vehicle> First described is an overall configuration of a software management system for a vehicle. FIG. 1 is a view illustrating an example of the overall configuration of the software management system for the vehicle. As illustrated in FIG. 1, a software management system 100 for a vehicle includes a management server 110, a vehicle 120, and a portable terminal 140. In the present embodiment, the management server 110 is connected to the vehicle 120 so as to be communicable via a network 150. Further, the management server 110 is connected to the portable terminal 140 so as to be communicable via the network 150.

A software control program and a user control program are installed in the management server 110, and when these programs are executed, the management server 110 functions as a software management portion 111 and a user management portion 112.

The software management portion 111 manages software related to an automatic driving function or a driving support function, installed in an automatic driving or driving support system 132 provided in the vehicle 120. Note that the software related to the automatic driving function or the driving support function is software that requires a permission of a user as a general rule at the time of an update to software of a latest version. However, in the future, the permission of the user may not be required. In view of this, the following description will be made on the premise that the software of the latest version to update the software related to the automatic driving function or the driving support function includes software that requires the permission of the user and software that does not require the permission of the user.

More specifically, the software management portion 111 monitors whether or not the software of the latest version is newly acquired for the software installed in the automatic driving or driving support system 132. When the software management portion 111 newly acquires the software of the latest version, the software management portion 111 stores the software in a software DB 113 and determines that an update by the software of the latest version is required, so as to transmit the software of the latest version to the vehicle 120. Hereby, the software installed in the automatic driving or driving support system 132 is updated.

Further, in order to restrict an operation of part or all of the automatic driving function or the driving support function according to an update status of the software installed in the automatic driving or driving support system 132, the software management portion 111 instructs a function restriction to the vehicle 120.

Further, the software management portion 111 stores, in a user information DB 114, the update status of the software installed in the automatic driving or driving support system 132.

The user management portion 112 is an example of an analysis portion, and is configured to analyze the update status of the software installed in the automatic driving or driving support system 132 for each user with reference to the user information DB 114.

The vehicle 120 includes a DCM (Data Communication Module) 131 and the automatic driving or driving support system 132. The DCM 131 is a communications device and is connected to the management server 110 via the network 150.

The automatic driving or driving support system 132 executes the software installed therein and related to the automatic driving function or the driving support function, so as to implement the automatic driving function or the driving support function. Further, the automatic driving or driving support system 132 updates the software installed therein and related to the automatic driving function or the driving support function, by use of the software of the latest version, transmitted from the management server 110. Further, the automatic driving or driving support system 132 restricts the operation of part or all of the automatic driving function or the driving support function, according to the instruction of the function restriction from the management server 110.

An update permission program is installed in the portable terminal 140, and when the program is executed in the portable terminal 140, the portable terminal 140 functions as an update permission portion 141.

The update permission portion 141 communicates with the management server 110, and when the software of the latest version newly stored in the software DB 113 is software that requires a permission of the user, the update permission portion 141 receives an input of an update permission from the user. When the management server 110 is not communicably connected to the vehicle 120, the management server 110 inquires of the portable terminal 140 about whether the update of the software is permitted or not. On this account, when the update permission portion 141 receives, from the management server 110, an inquiry about whether the update is permitted or not, the update permission portion 141 receives an input of the update permission from the user and transmits it to the management server 110.

As such, the update permission can be input in advance via the portable terminal 140, so the user of the vehicle 120 can input the update permission at a timing different from a timing when the user performs a driving operation on the vehicle 120. As a result, the user of the vehicle 120 can easily permit the update of the software. Further, when the vehicle 120 is communicably connected to the management server 110 (e.g., when an IG-ON state is established), the update of the software can be executed promptly without inquiring of the user about whether the update is permitted or not.

Figure 2:
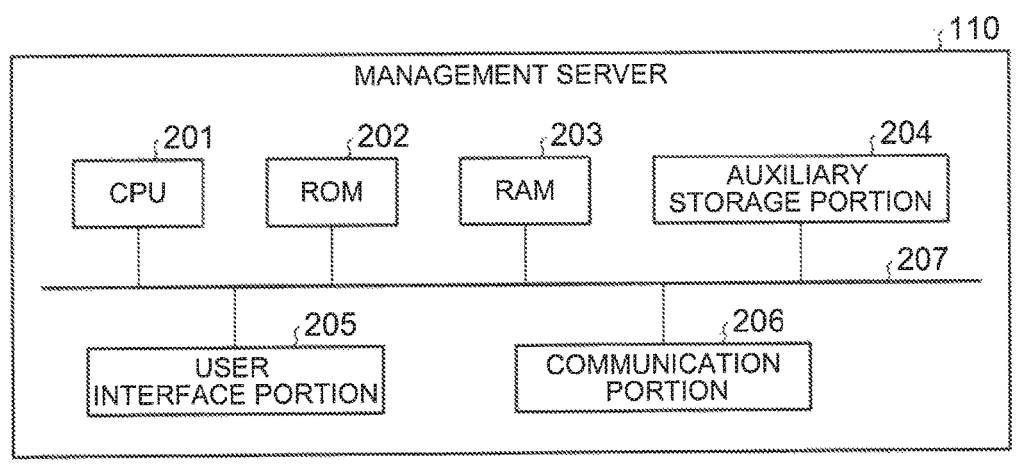
FIG. 2 is a view illustrating an example of a hardware configuration of a management server.

<2. Hardware Configuration of Management Server>
Next will be described a hardware configuration of the management server 110. FIG. 2 is a view illustrating an example of the hardware configuration of the management server.

As illustrated in FIG. 2, the management server 110 includes a CPU (Central Processing Unit) 201, a ROM (Read Only Memory) 202, a RAM (Random Access Memory) 203, an auxiliary storage portion 204, a user interface portion 205, and a communication portion 206, Note that respective portions of the management server 110 are connected to each other via a bus 207.

The CPU 201 is a computer that executes a program (the software control program, the user control program, and the like) stored in the ROM 202 and the auxiliary storage portion 204 with the RAM 203 being used as a working area.

The user interface portion 205 inputs information necessary at the time when the CPU 201 executes a program, and outputs information generated by the CPU 201 executing the program.

The communication portion 206 is connected to the network 150, so as to communicate with the DCM 131 of the vehicle 120 or the portable terminal 140 via the network 150.

<3. Configuration of Automatic Driving or Driving Support System> Next will be described a system configuration of the automatic driving or driving support system 132 of the vehicle 120 and a hardware configuration of an automatic driving or driving support ECU (Electronic Control Unit) included in the system. FIG. 3A is a view illustrating an example of the system configuration of the automatic driving or driving support system 132. FIG. 3B is a view illustrating the hardware configuration of the automatic driving ECU or the driving support ECU included in the system.

As illustrated in FIG. 3A, the automatic driving or driving support system 132 includes an automatic driving or driving support ECU 300. Further, the automatic driving or driving support system 132 includes an automatic driving switch 301, a GPS (Global Positioning System) 302, a vehicle speed sensor 303, a yaw rate sensor 304, a camera 305, a millimeter wave radar 306, and a lidar 307. Further, the automatic driving or driving support system 132 includes an accelerator pedal sensor 308, a brake pedal sensor 309, a steering angle sensor 310, a throttle actuator 311, a brake actuator 312, a steering actuator 313, a display device 314, and an automatic driving information DB 315.

The automatic driving or driving support ECU 300 executes software related to the automatic driving function or software related to the driving support function, installed in an automatic driving or driving support software storage portion 322, so as to implement the automatic driving function or the driving support function. The automatic driving or driving support ECU 300 transmits and receives information to/from the automatic driving switch 301 to the lidar 307 and the accelerator pedal sensor 308 to the automatic driving information DB 315, so as to implement the automatic driving function or the driving support function. Note that the description about the automatic driving function or the driving support function implemented by the automatic driving or driving support ECU 300 is omitted here.

Further, a version control program is installed in the automatic driving or driving support ECU 300. The automatic driving or driving support ECU 300 also functions as a version management portion 321 by executing the version control program.

When the version management portion 321 receives software of a latest version from the management server 110, the version management portion 321 updates the software that has been already installed, by use of the software of the latest version thus received. Further, upon receipt of an instruction of a function restriction from the management server 110, the version management portion 321 starts a process of restricting an operation of part or all of the automatic driving function or the driving support function at a predetermined timing before the update by the software of the latest version is completed. The predetermined timing is a timing of a next IG-ON state after the vehicle 120 receives the instruction of the function restriction, for example. The process of restricting the operation of part or all of the automatic driving function or the driving support function continues until the update by the software of the latest version is completed, and when the update is completed, the restriction is reset. Note that details of the function by the version management portion 321 will be described later.

As illustrated in FIG. 3B, the automatic driving or driving support ECU 300 functioning as the version management portion 321 includes a CPU 331, a RAM 332, a connecting portion 333, and a ROM 334. In the present embodiment, the version control program is stored in the ROM 334. Further, the version control program is executed by the CPU 331 with the RAM 332 and the like being used as a working area, so as to implement a function as the version management portion 321 while transmitting and receiving information to/from the DCM 131 connected via the connecting portion 333.

Note that, for the simplification of the description, the following deals with a case where a driving support system 132 is provided in the vehicle 120, and software related to the driving support function, installed in a driving support software storage portion 322 of the driving support ECU 300, is updated. Note that this will apply to a case where an automatic driving system is provided (a case where software related to the automatic driving function, installed in an automatic driving software storage portion of an automatic driving support ECU, is updated).

<4. Information Stored in Management Server> Next will be described information stored in the software DB 113 and in the user information DB 114 of the management server 110. FIG. 4 is views illustrating examples of software information stored in the software DB and user information stored in the user information DB.

As illustrated in FIG. 4A, software information 400 stored in the software DB 113 includes "software ID," "software name," "creator," "date of creation," "Ver," and "necessity of permission" as information items.

In the "software ID," an identifier to identify software related to the driving support function is stored. In the "software name," a name of the software specified by the software ID) is stored. In the "creator," information about a creator of the software specified by the software ID is stored. In the "date of creation," a date of creation of the software specified by the software ii) is stored.

In the "Ver," version information of the software specified by the software ID is stored. In the "necessity of permission," information indicative of whether or not the software specified by the software ID is software that requires a permission of a user at the time of an update is stored.

As illustrated in FIG. 4B, user information 410 stored in the user information DB 114 includes "vehicle ID," "vehicle number," "DCM," "user attribute," "portable terminal," "update status of software," and "function restriction" as information items.

In the "vehicle ID," an identifier to identify a vehicle is stored. In the "vehicle number," information of a number plate of the vehicle specified by the vehicle ID is stored. In the "DCM," a type of DCM provided in the vehicle specified by the vehicle ID is stored.

In the "user attribute," information about an attribute of a user who owns the vehicle specified by the vehicle ID is stored. The "user attribute" includes sub-items such as "name," "sex," "age," and "address." The "portable terminal" includes information to identify a portable terminal possessed by the user who owns the vehicle specified by the vehicle ID.

In the "update status of software," information about an update status of each vehicle in terms of the software stored in the software DB 113 is stored. The information about the update status is managed per software. On this account, the "update status of software" further includes, as sub-items, "S/W101," "S/W203," "S/W301," etc.

Further, the information about the update status includes version information of software installed in the driving support system 132 of each vehicle, and information (not permitted, permitted, completed) indicative of each status until the update is completed by latest software.

When the information about the update status is "not permitted," it indicates a state where software requires a permission of a user at the time of an update, but the update has not been permitted by the user yet. Further, when the information about the update status is "permitted," it indicates a state where an update of software that requires a permission of a user at the time of the update has been permitted by the user, but the update of the software has not been completed yet. Further, when the information about the update status is "completed," it indicates a state where an update of software that requires a permission of a user at the time of the update has been already permitted by the user, and the update of the software has been already completed. Note that, even in a case where the permission of the user is not required for the update and the update of the software has been already completed, the information about the update status shows "completed."

In terms of the "function restriction," in a case where software of a latest version, which requires a permission of a user, is newly stored in the software DB 113 and an ON instruction of its function restriction flag is transmitted to each vehicle, information indicating that the instruction is being made is stored. The function restriction flag is a control flag that enables a restriction on the operation of part or all of the driving support function. The information indicating that the instruction is being made is deleted when an update permission is input by the user for software that requires the permission of the user and the update is completed. In an example of FIG. 4B, software having a software ID of "S/W101" and installed in a driving support software storage portion of a vehicle having a vehicle ID of "C2" is not a latest version and requires an update to Ver of "1.3.1." However, the update is not permitted by the user of the vehicle having the vehicle ID of "C2," so information indicating that an instruction is being made is stored in the "function restriction" in the example of FIG. 4B.

<5. Driving Support Software Information Stored in Driving Support ECU> Next will be described driving support software information indicative of information about software installed in the driving support software storage portion 322 of the driving support ECU 300. The driving support software information is stored in the driving support software storage portion 322. The driving support software information is rewritten when the software related to the driving support function, installed in the driving support software storage portion 322, is updated by software transmitted from the management server 110. Further, the driving support software information is rewritten when the operation of part or all of the driving support function implemented by the software related to the driving support function is restricted based on an instruction from the management server 110. Further, the driving support software information is also rewritten when the restriction is reset.

FIG. 5 is views each illustrating an example of the driving support software information. Among them, FIG. 5A illustrates driving support software information stored in a driving support software storage portion of a vehicle having a vehicle ID of "C1," and FIG. 5B illustrates driving support software information stored in a driving support software storage portion of the vehicle having a vehicle ID of "C2." Further, FIG. 5C illustrates driving support software information stored in a driving support software storage portion of a vehicle having a vehicle ID of "C3."

As illustrated in FIG. 5, each driving support software information includes "software ID," "software name," "creator," "date of creation," "Ver," and "function restriction flag" as information items.

In the "software ID," an identifier to identify software installed in the driving support software storage portion 322 is stored. In the "software name," the "creator," the "date of creation," and the "Ver," a name of the software identified by the software ID, information about a creator thereof, a date of creation thereof, version information thereof are stored, respectively.

In the "function restriction flag," when an ON instruction of a function restriction flag is received from the management server 110 about the software identified by the software ID, "ON" is stored, and when the function restriction is reset, "OFF" is stored.

The example of FIG. 5A shows that software identified by a software ID of "S/W101" is installed in the driving support system 132 of the vehicle having the vehicle ID of "C1." Further, the example of FIG. 5A also shows that the software is software of Ver of "1.3.1" and an update to its latest version is completed, so "OFF" is stored in the "function restriction flag."

The example of FIG. 5B shows that pieces of software identified by software IDs of "S/W101" and "S/W203" are installed in the driving support system 132 of the vehicle having the vehicle ID of "C2." Further, the example of FIG. 5B shows that the software identified by the software ID of "S/W101" is software of Ver of "1.3.0," which is not a latest version. On this account, "ON" is stored in the "function restriction flag."

Further, the example of FIG. 5B also shows that the software identified by the software ID of "S/W203" is software of Ver of "2.1" and an update to its latest version is completed, so "OFF" is stored in the "function restriction flag."

The example of FIG. 5C shows that pieces of software identified by software IDs of "S/W203" and "S/W301" are installed in the driving support system 132 of the vehicle having the vehicle ID of "C3." Further, the example of FIG. 5C shows that the software identified by the software ID of "S/W203" is software of Ver of "2.0," which is not a latest version. However, as illustrated in FIG. 4B, an update to the software of the latest version has been already permitted, and no ON instruction of the function restriction flag is transmitted from the management server 110, so "OFF" is stored in the "function restriction flag."

Further, the example of FIG. 5C also shows that the software identified by the software ID of "S/W301" is software that does not require a permission of the user, so "ON" and "OFF" are never stored in the "function restriction flag."

Figure 6:
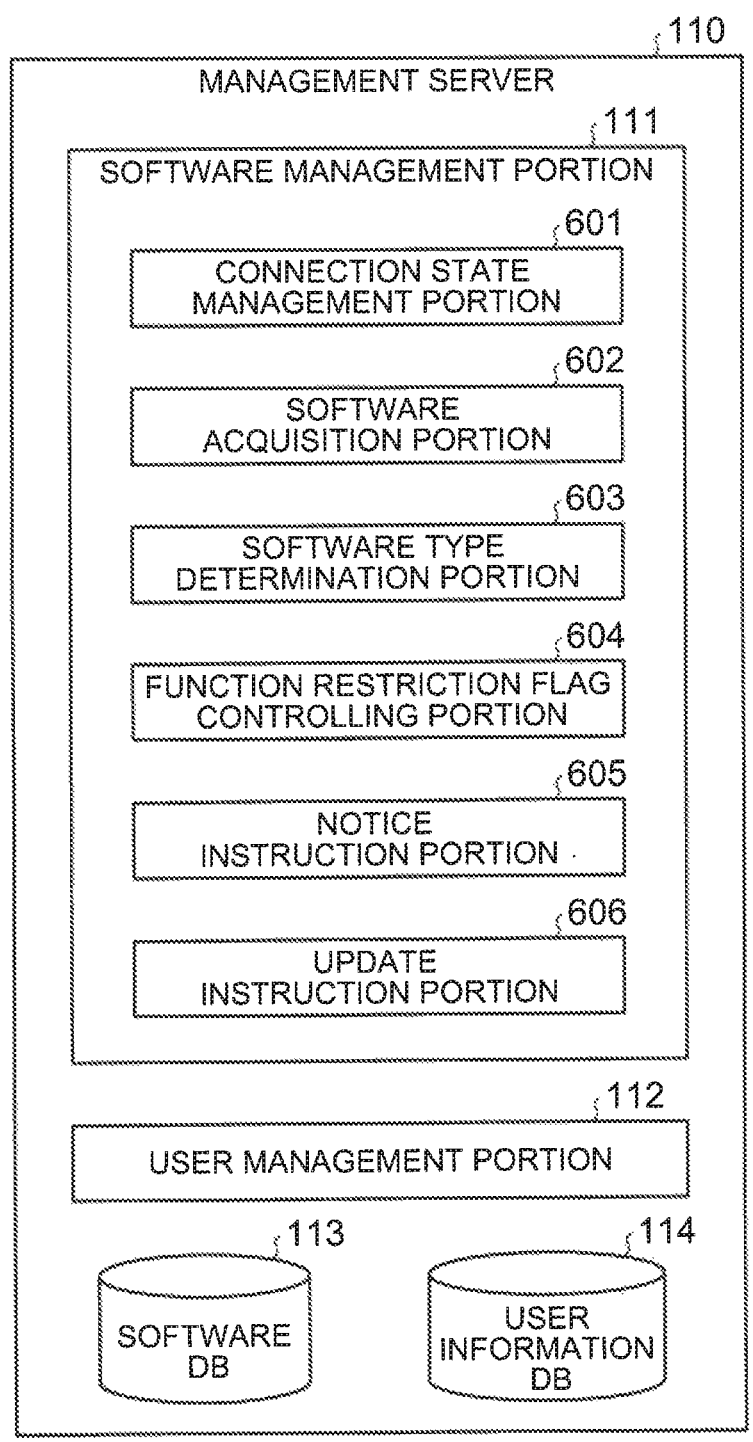
FIG. 6 is a view illustrating an example of functional configurations of a software management portion and a user management portion of the management server.

<6. Details of Functional Configuration of Management Server> Next will be described details of functional configurations of the software management portion 111 and the user management portion 112 of the management server 110. FIG. 6 is a view illustrating an example of the functional configurations of the software management portion and the user management portion of the management server.

As illustrated in FIG. 6, the software management portion 111 includes a connection state management portion 601, a software acquisition portion 602, a software type determination portion 603, a function restriction flag controlling portion 604, a notice instruction portion 605, and an update instruction portion 606.

The connection state management portion 601 manages whether or not a vehicle as a management target to be managed by the management server 110 is being communicably connected to the management server 110. Further, the connection state management portion 601 manages whether or not a portable terminal possessed by a user of the vehicle as the management target to be managed by the management server 110 is being communicably connected to the management server 110.

The software acquisition portion 602 acquires software of a latest version to update software installed in the driving support ECU 300, and stores it in the software DB 113. When the software acquisition portion 602 newly acquires the software of the latest version and stores it in the software DB 113, the software acquisition portion 602 determines that an update is required in terms of the software installed in the driving support ECU 300. That is, the software acquisition portion 602 functions as an update necessity determination portion that determines whether or not the update is required in terms of the software installed in the driving support ECU 300.

The software type determination portion 603 determines whether the software (the software determined to require the update) of the latest version, newly acquired by the software acquisition portion 602 and stored in the software DB 113, is software that requires a permission of the user or not for update.

When it is determined that the software is software that requires the permission of the user, the software type determination portion 603 notifies the function restriction flag controlling portion 604 and the notice instruction portion 605 of the determination result. Further, when it is determined that the software is software that does not require the permission of the user, the software type determination portion 603 notifies the update instruction portion 606 of the determination result.

The function restriction flag controlling portion 604 is an example of a controlling portion. When the function restriction flag controlling portion 604 receives the determination result from the software type determination portion 603, the function restriction flag controlling portion 604 transmits an ON instruction of a function restriction flag to a target vehicle. When the function restriction flag controlling portion 604 transmits the ON instruction of the function restriction flag, the function restriction flag controlling portion 604 stores, in the "function restriction" of the user information 410, information indicating that the instruction is being made.

When the notice instruction portion 605 receives a determination result from the software type determination portion 603, the notice instruction portion 605 instructs the target vehicle to perform an update permission request about the software that requires the permission of the user. Further, in response to the update permission request, the notice instruction portion 605 determines whether or not information indicating that an update permission is input by the user of the target vehicle is transmitted from the target vehicle, and when it is determined that the information is transmitted, the notice instruction portion 605 notifies the update instruction portion 606 of the update being permitted.

The update instruction portion 606 is an example of a receiving portion. When the update instruction portion 606 receives the determination result from the software type determination portion 603, or when the update instruction portion 606 receives a notice of the update having been permitted from the notice instruction portion 605, the update instruction portion 606 transmits software of a latest version to the target vehicle and instructs the update. When the update instruction portion 606 receives an update completion notice of the software from the target vehicle in response to the instruction of the update from the update instruction portion 606, the update instruction portion 606 rewrites the "update status of software" of the user information 410 in the user information DB 114, and deletes information stored in the "function restriction."

Figure 7:
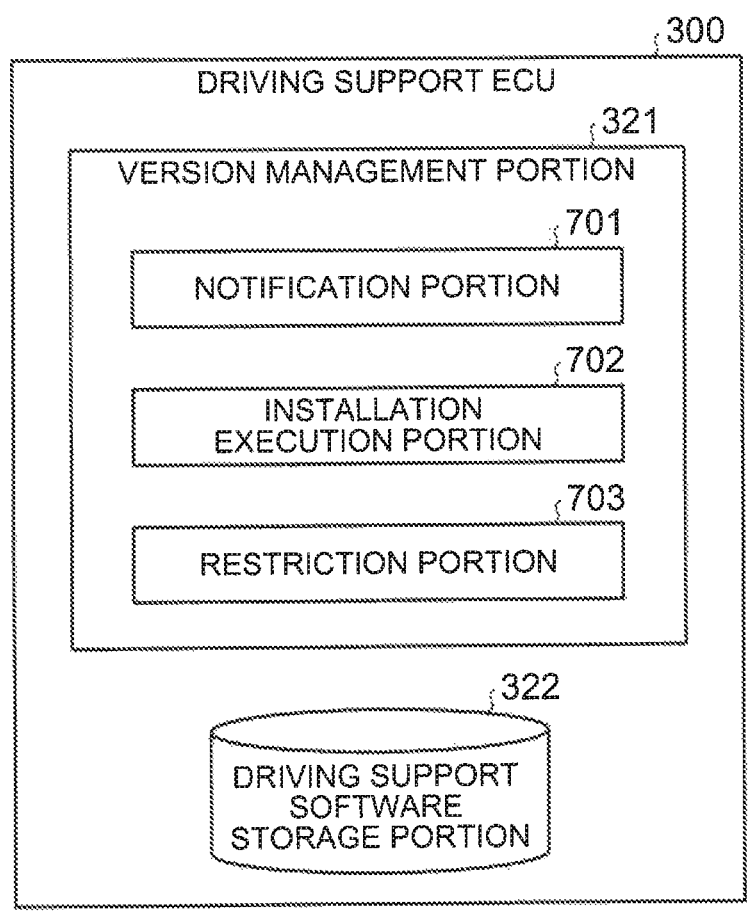
FIG. 7 is a view illustrating an example of a functional configuration of a version management portion of the driving support ECU.

<7. Details of Functional Configuration of Driving Support ECU> Next will be described details of a functional configuration of the version management portion 321 of the driving support ECU 300. FIG. 7 is a view illustrating an example of the function configuration of the version management portion of the driving support ECU.

As illustrated in FIG. 7, the version management portion 321 includes a notification portion 701, an installation execution pot ion 702, and a restriction portion 703.

When the notification portion 701 receives an instruction of an update permission request from the notice instruction portion 605 of the management server 110, the notification portion 701 displays a permission request screen to inquire of the user of the vehicle 120 about whether the update by the software of the latest version is permitted or not. Further, the notification portion 701 receives an input of an update permission from the user by displaying the permission request screen. When the notification portion 701 receives an input of the update permission from the user, the notification portion 701 determines that the update is permitted, and transmits, to the management server 110, information indicating that the update permission has been input.

The installation execution portion 702 is an example of an update portion. When the installation execution portion 702 receives the software of the latest version from the management server 110, the installation execution portion 702 updates software that has been already installed in the driving support software storage portion 322, by use of the software of the latest version. Further, when the update by the software of the latest version is completed, the installation execution portion 702 transmits an update completion notice to the management server 110, and also transmits it to the restriction portion 703.

The restriction portion 703 is an example of a restriction portion. When the restriction portion 703 receives an ON instruction of the function restriction flag from the management server 110, the restriction portion 703 stores "ON" in the "function restriction flag" of the driving support software information 510 stored in the driving support software storage portion 322.

Further, when the vehicle enters an IG-ON state, the restriction portion 703 refers to the driving support software information 510 stored in the driving support software storage portion 322, so as to determine whether or not the function restriction flag is in an ON state. When it is determined that the function restriction flag is in the ON state, the restriction portion 703 restricts the operation of part of or all of the driving support function related to the software (performs a function restriction).

Further, when the restriction portion 703 receives an update completion notice from the installation execution portion 702, the restriction portion 703 stores "OFF" in the "function restriction flag" of the driving support software information 510 stored in the driving support software storage portion 322. Further, in a case where the function restriction has been already performed at the time of receiving the update completion notice, the restriction portion 703 resets the function restriction.

<8. Description of Process Executed by Management Server> Next will be described processes to be executed by the management server 110 (an IG-ON state management process for the target vehicle, a connection state management process for the target portable terminal, a version management process).

Figure 8A:
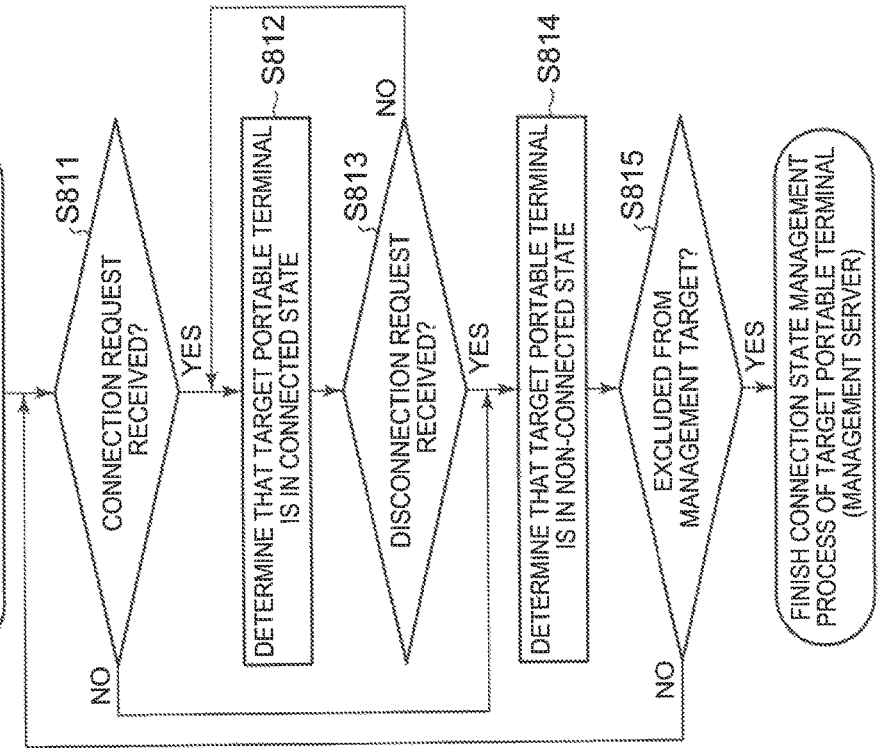
FIG. 8A is a flowchart illustrating a flow of an IG-ON state management process of a target vehicle in the management server.
Figure 8B:
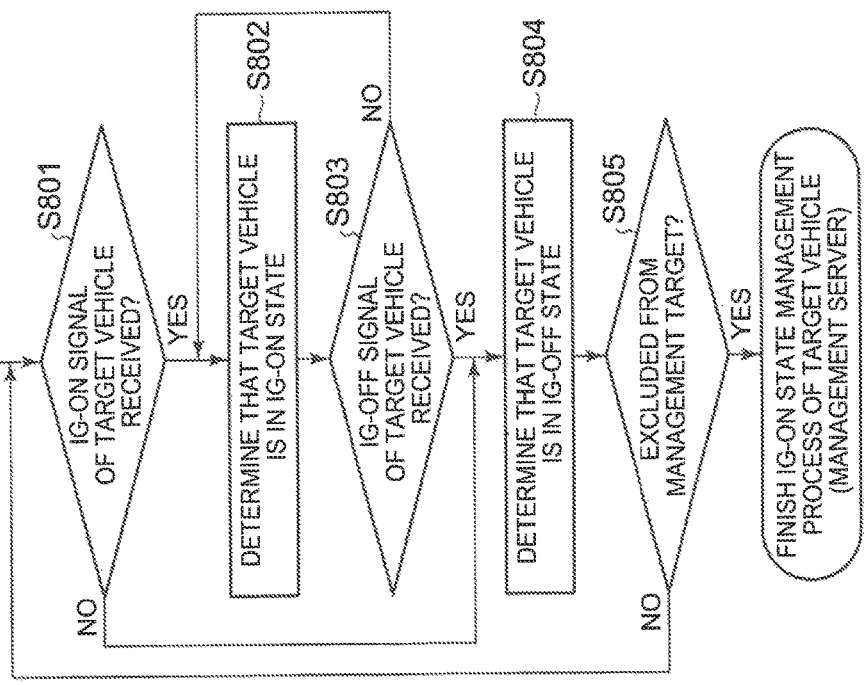
FIG. 8B is a flowchart illustrating a flow of a connection state management process of a target portable terminal in the management server.

(1) IG-ON State Management Process for Target Vehicle and Connection State Management Process for Target Portable Terminal FIGS. 8A, 8B are flowcharts illustrating respective flows of the IG-ON state management process for the target vehicle and the connection state management process for the target portable terminal in the management server, respectively.

As illustrated in FIG. 8A, in step S801, the connection state management portion 601 determines whether or not an IG-ON signal of the target vehicle is received. In step S801, when it is determined that the IG-ON signal of the target vehicle is not received, the process proceeds to step S804.

In the meantime, in step S801, when it is determined that the IG-ON signal of the target vehicle is received, the process proceeds to step S802. In step S802, the connection state management portion 601 determines that the target vehicle is in an IG-ON state.

In step S803, the connection state management portion 601 determines whether or not an IG-OFF signal of the target vehicle is received. In step S803, when it is determined that the IG-OFF signal of the target vehicle is not received, the process returns to step S802.

In the meantime, in step S803, when it is determined that the IG-OFF signal of the target vehicle is received, the process proceeds to step S804. In step S804, the connection state management portion 601 determines that the target vehicle is in an IG-OFF state.

In step S805, the connection state management portion 601 determines whether or not the target vehicle is excluded from the management target. When it is determined that the target vehicle is not excluded from the management target, the process returns to step S801. In the meantime, when it is determined that the target vehicle is excluded from the management target, the IG-ON state management process on the target vehicle is finished.

As illustrated in FIG. 8B, in step S811, the connection state management portion 601 determines whether or not a connection request of the target portable terminal is received. In step S811, when it is determined that the connection request of the target portable terminal is not received, the process proceeds to step S814.

In the meantime, in step S811, when it is determined that the connection request of the target portable terminal is received, the process proceeds to step S812. In step S812, the connection state management portion 601 determines that the target portable terminal is in a connected state.

In step S813, the connection state management portion 601 determines whether or not a disconnection request of the target portable terminal is received. In step S813, when it is determined that the disconnection request of the target portable terminal is not received, the process returns to step S812.

In the meantime, in step S813, when it is determined that the disconnection request of the target portable terminal is received, the process proceeds to step S814. In step S814, the connection state management portion 601 determines that the target portable terminal is in a disconnected state.

In step S815, the connection state management portion 601 determines whether or not the target portable terminal is excluded from the management target. When it is determined that the target portable terminal is not excluded from the management target, the process returns to step S811. In the meantime, when it is determined that the target portable terminal is excluded from the management target, the connection state management process on the target portable terminal is finished.

Figure 9:
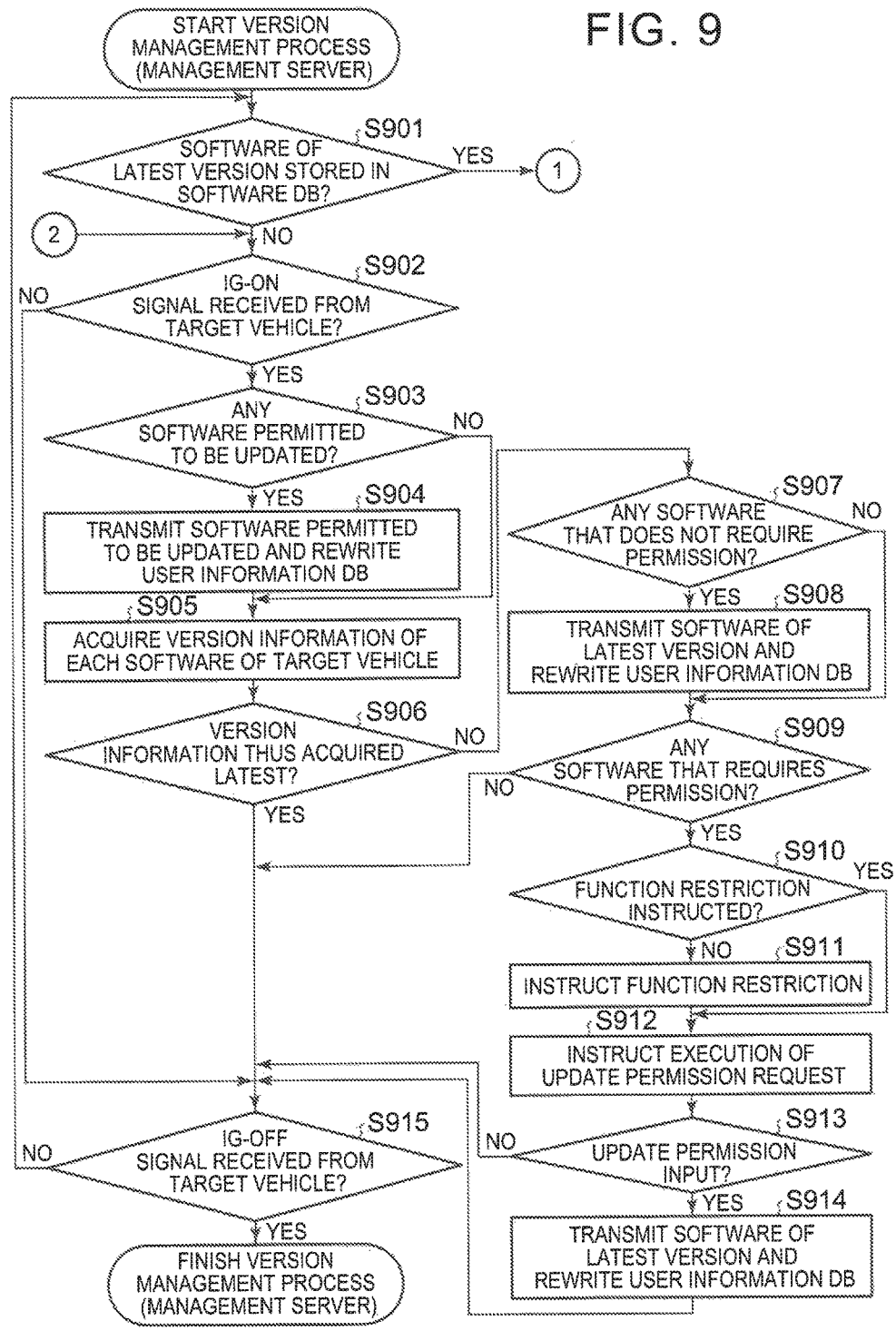
FIG. 9 is a flowchart illustrating a flow of a version management process in the management server.
Figure 10:
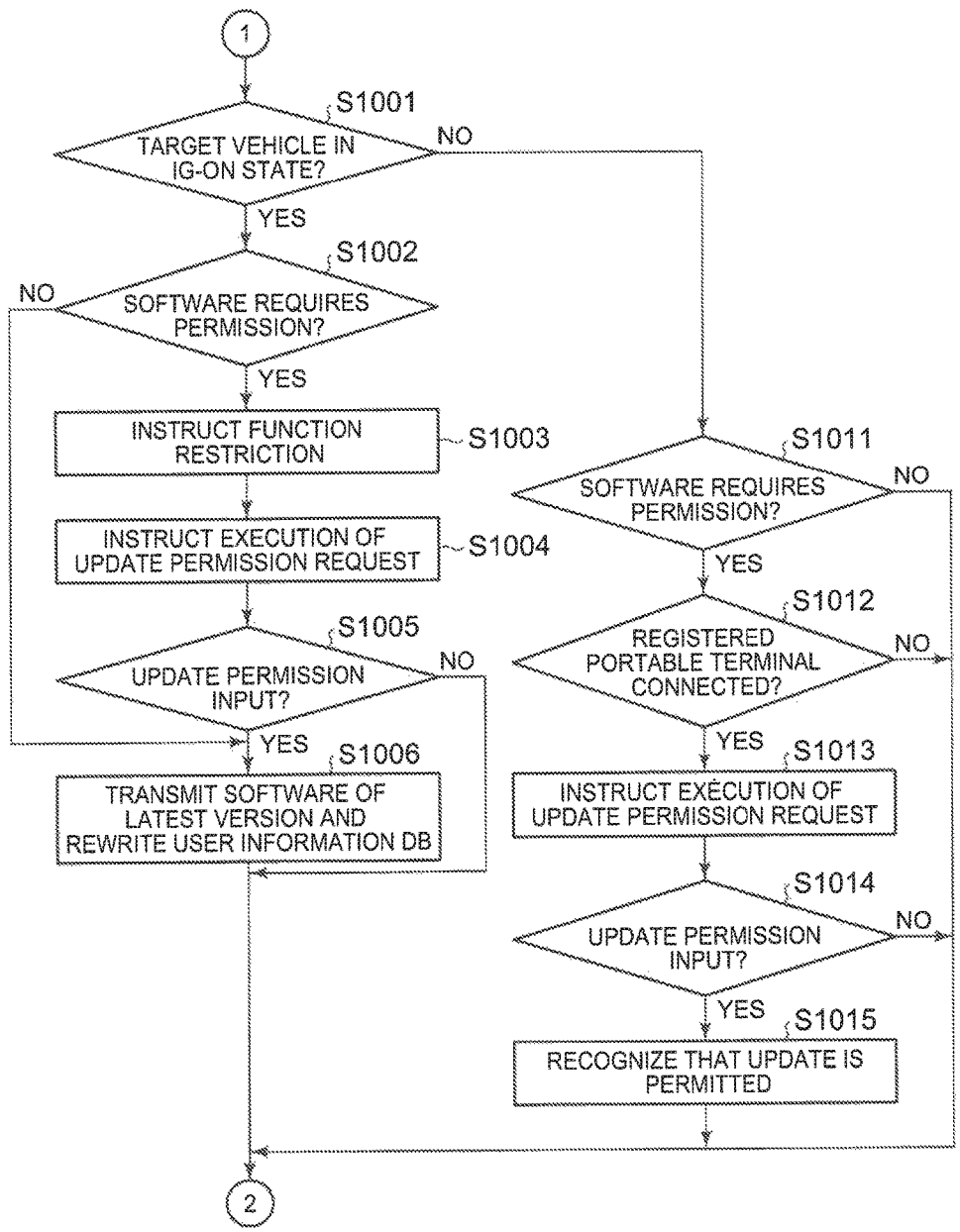
FIG. 10 is a flowchart illustrating a flow of the version management process in the management server.

(2) Flow of Version Management Process FIGS. 9 and 10 are flowcharts illustrating a flow of the version management process in the management server. As illustrated in FIG. 9, in step S901, the software acquisition portion 602 newly acquires software of a latest version, and determines whether or not the software is stored in the software DB 113.

In step S901, when it is determined that the software of the latest version is not newly acquired, the software acquisition portion 602 determines that an update to the software of the latest version is not necessary, and the process proceeds to step S902. In step S902, the connection state management portion 601 determines whether or not an IG-ON signal of the target vehicle is received. In step S902, when it is determined that the IG-ON signal is not received, the process proceeds to step S915.

In the meantime, in step S902, when it is determined that the IG-ON signal is received, the process proceeds to step S903. In step S903, the update instruction portion 606 determines whether or not there is software that has been already permitted to be updated by the user of the target vehicle.

In step S903, when it is determined that there is the software that has been already permitted to be updated, the process proceeds to step S904. In step S904, the update instruction portion 606 transmits, to the target vehicle, the software that has been already permitted to be updated, and rewrites the "update status of software" of the user information 410 in the user information DB 114. Then, the process proceeds to step S905. In the meantime, in step S903, when it is determined that there is no software permitted to be updated, the process directly proceeds to step S905.

In step S905, the software type determination portion 603 acquires, from the target vehicle, version information of each software installed in the driving support software storage portion 322 of the target vehicle.

In step S906, the software type determination portion 603 determines, based on the version information acquired in step S905, whether each software installed in the driving support software storage portion 322 of the target vehicle is a latest version.

When it is determined, in step S906, that the each software is the latest version, the process proceeds to step S915. In the meantime, when it is determined that the each software is not the latest version, the process proceeds to step S907.

In step S907, the software type determination portion 603 determines whether or not there is software that does not require a permission of the user at the time of an update, among pieces of software that is determined not to be the latest version.

In step S907, when it is determined that there is the software that does not require the permission of the user, the process proceeds to step S908. In step S908, the update instruction portion 606 transmits, to the target vehicle, the software which is the latest version and which does not require the permission of the user. Further, the update instruction portion 606 rewrites the "update status of software" of the user information 410 in the user information DB 114, and the process proceeds to step S909.

In the meantime, when it is determined, in step S907, that there is no software that does not require the permission of the user, the process directly proceeds to step S909.

In step S909, the software type determination portion 603 determines whether or not there is software that requires a permission of the user at the time of an update, among the pieces of software that is determined not to be the latest version.

In step S909, when it is determined that there is no software that requires the permission of the user, the process proceeds to step S915. In the meantime, in step S909, when it is determined that there is the software that requires the permission of the user, the process proceeds to step S910.

In step S910, the function restriction flag controlling portion 604 determines whether or not an ON instruction of a function restriction flag is transmitted in terms of the software that requires the permission of the user. In step S910, when it is determined that the ON instruction of the function restriction flag is not transmitted, the process proceeds to step S911.

In step S911, the function restriction flag controlling portion 604 transmits, to the target vehicle, the ON instruction of the function restriction flag in terms of the software that requires the permission of the user, and the process proceeds to step S912. In the meantime, in step S910, when it is determined that the ON instruction of the function restriction flag has been already transmitted, the process directly proceeds to step S912.

In step S912, the notice instruction portion 605 instructs the target vehicle to perform an update permission request in terms of the software that requires the permission of the user.

When a permission request is performed on the target vehicle in response to the instruction of the update permission request, the notice instruction portion 605 determines, in step S913, whether or not information indicating that the update permission has been input by the user of the target vehicle is received from the target vehicle. In step S913, when it is determined that the information indicating that the update permission has been input is received from the target vehicle, the process proceeds to step S914.

In step S914, the update instruction portion 606 transmits, to the target vehicle, the software of the latest version (the software permitted to be updated by the user). Further, the update instruction portion 606 rewrites the "update status of software" of the user information 410 in the user information DB 114, and the process proceeds to step S915.

In the meantime, in step S913, when it is determined that the information indicating that the update permission has been input is not received from the target vehicle, the process directly proceeds to step S915.

In step S915, the connection state management portion 601 determines whether or not an IG-OFF signal is received from the target vehicle. In step S915, when it is determined that the IG-OFF signal is not received from the target vehicle, the process returns to step S901. Thus, the version management process in the management server 110 continues until the IG-OFF signal is received from the target vehicle.

In the meantime, in step S901, when it is determined that the software of the latest version is newly acquired and stored in the software DB 113, the software acquisition portion 602 determines that an update to the software of the latest version is necessary, and the process proceeds to step S1001 in FIG. 10.

In step S1001, the connection state management portion 601 determines whether or not the target vehicle is in an IG-ON state. In step S1001, when it is determined that the target vehicle is in the IG-ON state, the process proceeds to step S1002.

In step S1002, the software type determination portion 603 determines whether or not the software of the latest version thus newly stored is software that requires a permission of the user. In step S1002, when it is determined that the software is software that does not require the permission of the user, the process proceeds to step S1006.

In the meantime, in step S1002, when it is determined that there is the software that requires the permission of the user, the process proceeds to step S1003.

In step S1003, the function restriction flag controlling portion 604 transmits, to the target vehicle, an ON instruction of a function restriction flag so as to restrict an operation of part or all of a driving support function related the software that is determined to require the permission of the user. After that, the process proceeds to step S1004.

In step S1004, the notice instruction portion 605 instructs the target vehicle to perform an update permission request in terms of the software that is determined to require the permission of the user.

When the permission request is performed in the target vehicle in response to the instruction of the update permission request, the notice instruction portion 605 determines, in step S1005, whether or not information indicating that the update permission has been input is received from the target vehicle. In step S1005, when it is determined that the information indicating that the update permission has been input is received, the process proceeds to step S1006.

In step S1006, the update instruction portion 606 transmits, to the target vehicle, the software of the latest version (the software permitted to be updated by the user). Further, the update instruction portion 606 rewrites the "update status of software" of the user information 410 in the user information DB 114, and the process returns to step S902 in FIG. 9.

In the meantime, in step S1005, when it is determined that the information indicating that the update permission has been input is not received, the process directly returns to step S902 in FIG. 9.

In the meantime, in step S1001, when it is determined that the target vehicle is not in the IG-ON state, the process proceeds to step S1011. In step S1011, the notice instruction portion 605 determines whether or not the software of the latest version newly stored is software that requires a permission of the user. In step S1011, when it is determined that the software is software that does not require the permission of the user, the process returns to step S902 in FIG. 9.

In the meantime, in step S1011, when it is determined that the software is software that requires the permission of the user, the process proceeds to step S1012. In step S1012, the connection state management portion 601 determines whether or not the portable terminal registered in association with the target vehicle is in a connected state.

In step S1012, when it is determined that the portable terminal is a non-connected state, the process returns to step S902 in FIG. 9. In the meantime, when it is determined that the portable terminal is in a connected state in step S1012, the process proceeds to step S1013.

In step S1013, the notice instruction portion 605 instructs the target portable terminal to perform an update permission request in terms of the software that is determined to require the permission of the user.

When the permission request is performed in the target portable terminal in response to the instruction of the update permission request, the notice instruction portion 605 determines, in step S1014, whether or not information indicating that an update permission has been input is received from the target portable terminal. In step S1014, when it is determined that the information indicating that the update permission has been input is received, the process proceeds to step S1015.

In step S1015, the notice instruction portion 605 recognizes that the update has been already permitted by the user in terms of the software that is determined to require the permission of the user, the notice instruction portion 605 rewrites the "update status of software" of the user information 410, and then, the process returns to step S902.

Figure 11:
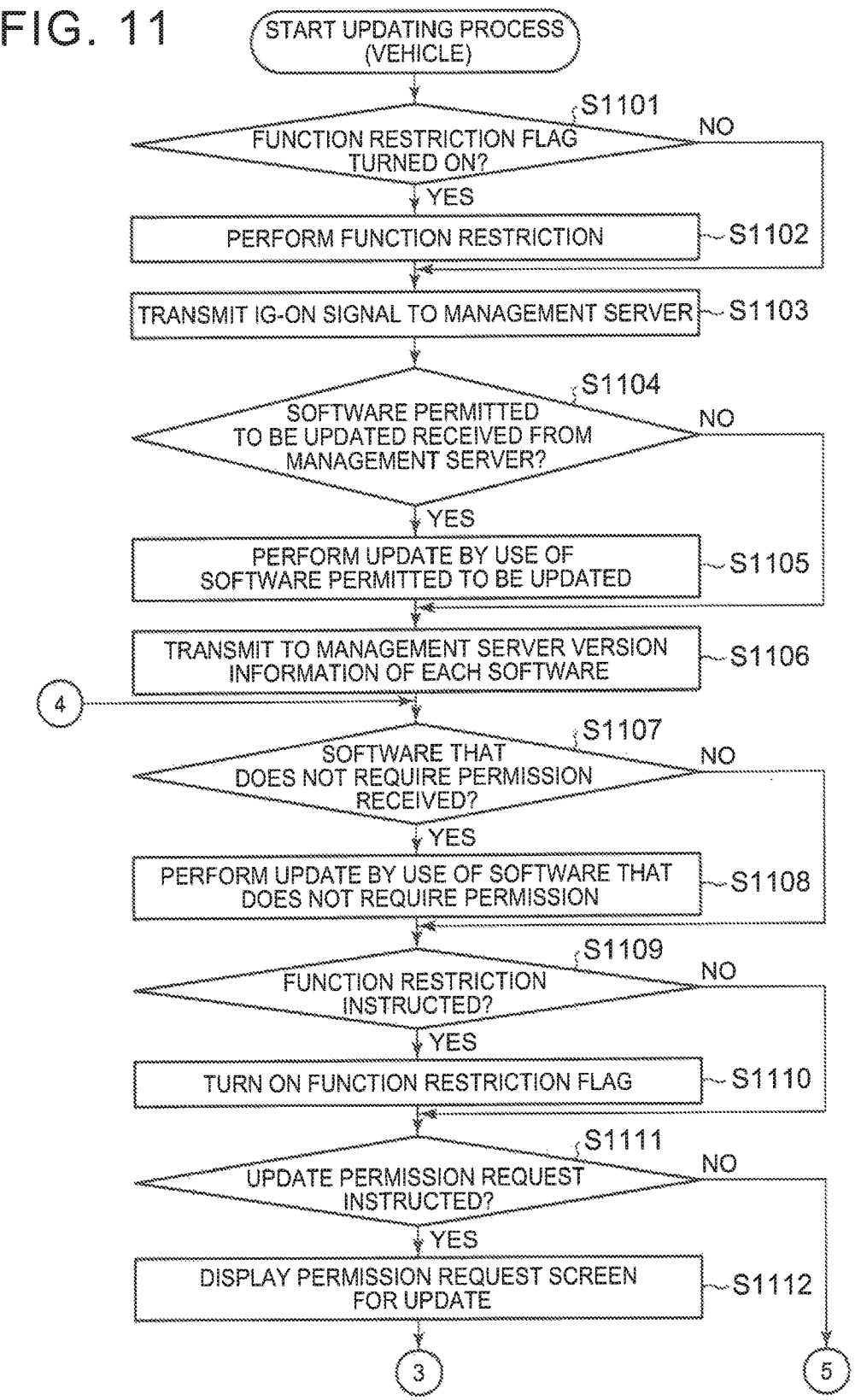
FIG. 11 is a flowchart illustrating a flow of an updating process in a vehicle.
Figure 12:
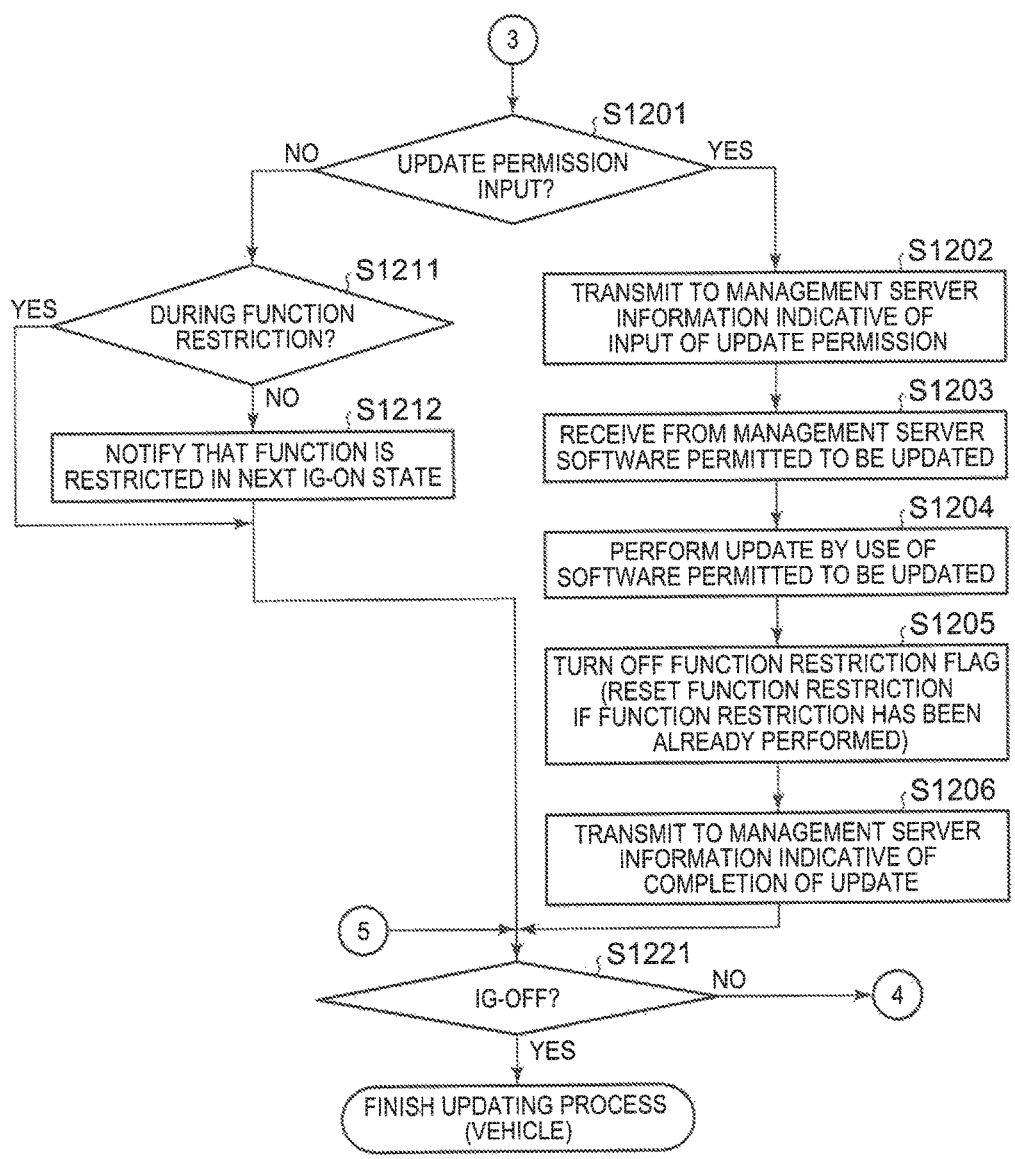
FIG. 12 is a flowchart illustrating a flow of the updating process in the vehicle.

<9. Description of Process Executed in Vehicle> Next will be described a flow of a process (an updating process) executed in the vehicle 120. FIGS. 11 and 12 are flowcharts each illustrating a flow of the updating process in the vehicle. In the flowcharts illustrated in FIGS. 11 and 12, the process is started when the vehicle enters an IG-ON state.

As illustrated in FIG. 11, in step S1101, the restriction portion 703 refers to the driving support software information 510 and determines whether or not there is software in which a function restriction flag is in an ON state. In step S1101, when it is determined that there is the software in which the function restriction flag is in the ON state, the process proceeds to step S1102. In the meantime, when it is determined that there is no software in which the function restriction flag is in the ON state, the process proceeds to step S1103.

In step S1102, the restriction portion 703 performs a function restriction that restricts an operation of part or all of a driving support function related to the software in which the function restriction flag is in the ON state.

In step S1103, the DCM 131 transmits an IG-ON signal to the management server 110.

In step S1104, the installation execution portion 702 determines whether or not software permitted to be updated is received from the management server 110. When there is the software permitted to be updated by the user via the portable terminal 140, the software permitted to be updated is transmitted from the management server 110. On this account, when the installation execution portion 702 determines that the software permitted to be updated is received from the management server 110, the process proceeds to step S1105.

In step S1105, the installation execution portion 702 updates software that has been already installed in the driving support software storage portion 322, by use of the software permitted to be updated, and the process proceeds to step S1106.

In the meantime, in step S1104, in a case where it is determined that the software permitted to be updated is not received from the management server 110, the process directly proceeds to step S1106.

In step S1106, the installation execution portion 702 acquires version information of each software installed in the driving support software storage portion 322, and transmits it to the management server 110.

In step S1107, the installation execution portion 702 determines whether or not software that does not require a permission of the user is received from the management server 110. In step S1107, when it is determined that the software that does not require the permission of the user is received, the process proceeds to step S1108.

In step S1108, the installation execution portion 702 updates software that has been already installed in the driving support software storage portion 322, by use of the software that does not require the permission of the user, and the process proceeds to step S1109.

In the meantime, in step S1107, when it is determined that the software that does not require the permission of the user is not received, the process directly proceeds to step S1109.

In step S1109, the restriction portion 703 determines whether or not an ON instruction of a function restriction flag is received from the management server 110. In step S1109, when it is determined that the ON instruction of the function restriction flag is received, the process proceeds to step S1110.

In step S1110, the restriction portion 703 stores "ON" in the "function restriction flag" of the driving support software information 510 based on the ON instruction from the management server 110, and the process proceeds to step S1111.

In the meantime, in step S1109, when it is determined that the ON instruction of the function restriction flag is not received, the process directly proceeds to step S1111.

In step S1111, the notification portion 701 determines whether or not an instruction of an update permission request is received from the management server 110. In step S1111, when it is determined that the instruction of the update permission request is received, the process proceeds to step S1112.

In step S1112, the notification portion 701 displays a permission request screen for software about which the update permission request is instructed by the management server 110, and the process proceeds to step S1201 in FIG. 12.

In the meantime, in step S1111, when it is determined that the instruction of the update permission request is not received, the process proceeds to step S1221 in FIG. 12.

In step S1201, the notification portion 701 determines whether or not an update permission is input by the user on the permission request screen. In step S1201, when it is determined that the update permission is input by the user within a predetermined time after the permission request screen is displayed, the process proceeds to step S1202.

In step S1202, the notification portion 701 transmits, to the management server 110, information indicating that the update permission has been input by the user. In step S1203, the installation execution portion 702 receives software permitted to be updated by the user from the management server 110.

In step S1204, the installation execution portion 702 updates software that has been already installed in the driving support software storage portion 322, by use of the software received from the management server 110.

When the update by the installation execution portion 702 is completed, the restriction portion 703 stores "OFF" in the "function restriction flag" of the driving support software information 510 in terms of the software that has been updated, in step S1205. Further, in a case where the function restriction has been already performed, the restriction portion 703 resets the function restriction on the driving support function related to the software that has been updated (that is, the function restriction is reset at a timing when the function restriction flag enters an OFF state).

In step S1206, the installation execution portion 702 transmits, to the management server 110, an update completion notice indicating that the update has been completed, and the process proceeds to step S1221.

In the meantime, in step S1201, when it is determined that the update permission is not input by the user within the predetermined time after the permission request screen is displayed, the process proceeds to step S1211. In step S1211, the restriction portion 703 determines whether or not the function restriction is being performed.

When it is determined, in step S1211, that the function restriction is not being performed, the process proceeds to step S1212. In step S1212, the notification portion 701 notifies the user that a function restriction is performed on software about which the permission is requested, in a next IG-ON state, and the process proceeds to step S1221.

In the meantime, when it is determined, in step S1211, that the function restriction is being performed, the process directly proceeds to step S1221. In step S1221, the restriction portion 703 determines whether or not the vehicle enters an IG-OFF state. In step S1221, when it is determined that the vehicle is not in the IG-OFF state, the process returns to step S1107. In the meantime, when it is determined that the vehicle is in the IG-OFF state, the updating process is finished.

Figure 13:
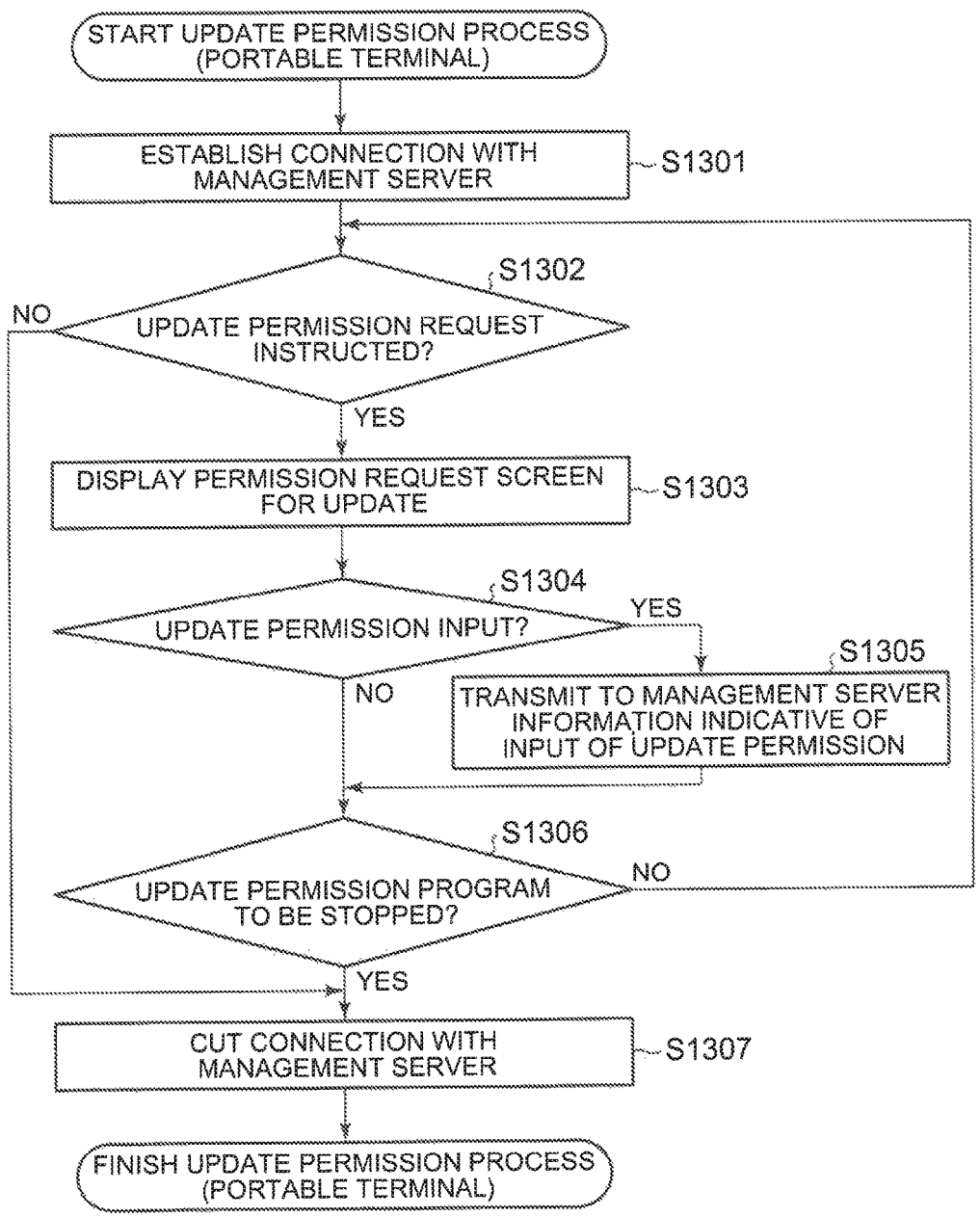
FIG. 13 is a flowchart illustrating a flow of an update permission process in a portable terminal.

<10. Description of Process Executed in Portable Terminal> Next will be described a flow of a process (an update permission process) executed in the portable terminal 140. FIG. 13 is a flowchart illustrating a flow of the update permission process in the portable terminal. In the flowchart illustrated in FIG. 13, the process is started when the update permission program is started in the portable terminal 140.

In step S1301, the update permission portion 141 establishes a connection with the management server 110. In step S1302, the update permission portion 141 determines whether or not an instruction of an update permission request is received from the management server 110.

In step S1302, when it is determined that the instruction of the update permission request is not received, the process proceeds to step S1307.

In the meantime, in step S1302, when it is determined that the instruction of the update permission request is received, the process proceeds to step S1303. In step S1303, the update permission portion 141 displays a permission request screen.

In step S1304, the update permission portion 141 determines whether or not an update permission is input by the user on the permission request screen. When it is determined that the update permission is input by the user within a predetermined time after the permission request screen is displayed, the process proceeds to step S1305. In step S1305, the update permission portion 141 transmits, to the management server 110, information indicating that the update permission has been input by the user, and then, the process proceeds to step S1306.

In the meantime, in step S1304, when it is determined that the update permission is not input within the predetermined time after the permission request screen is displayed, the process directly proceeds to step S1306.

In step S1306, the update permission portion 141 determines whether or not an instruction to finish the update permission program is input. In step S1307, when it is determined that the instruction to finish the update permission program is not input, the process returns to step S1302, In the meantime, in step S1306, when it is determined that the instruction to finish the update permission program is input, the process proceeds to step S1307. In step S1307, the update permission portion 141 cuts the connection with the management server 110, so as to finish the update permission process.

<11. Examples of Software Management System for Vehicle> Next will be described each example in the software management system 100 for the vehicle with reference to FIGS. 9 to 13. Note that, in the following description, in a first IG-ON state in the target vehicle, version information of software installed in the target vehicle is checked, and in a second IG-ON state, a function restriction is performed.

<11.1 Example 1> Example 1 deals with a scene in which: in a first IG-ON state, a plurality of pieces of software of a latest version is newly stored in the software DB 113, but an update is not permitted in the target vehicle; and in a second IG-ON state, a function restriction is performed. Note that the plurality of pieces of software includes software that does not require a permission of a user and software that requires the permission of the user.

(1) Process in Management Server 110 in Example 1 (First IG-ON State) In a case of Example 1, before the plurality of pieces of software of the latest version is newly stored in the software DB 113, the connection state management portion 601 receives an IG-ON signal from the target vehicle (step S901 (No)→S902 (Yes)).

At this point, there is no software permitted to be updated (step S903 (No)). Further, since version information of each software installed in the driving support software storage portion 322 is transmitted from the target vehicle, the software type determination portion 603 acquires this (step S905).

At this point of time, software of the latest version is installed in the driving support software storage portion 322 of the target vehicle. On this account, the management server 110 waits until the software of the latest version is newly acquired and stored in the software DB 113 (step S906 (Yes)→S915 (No)→S901).

Here, the plurality of pieces of software of the latest version (the software that does not require the permission of the user, and the software that requires the permission of the user) is assumed to be newly acquired and stored in the software DB 113 (step S901 (Yes)). Note that, at this point of time, the target vehicle has been already in the IG-ON state (step S1001 (Yes)).

Accordingly, among the pieces of software of the latest version, the software that does not require the permission of the user is transmitted by the update instruction portion 606 to the target vehicle, and the user information DB 114 is rewritten (step S1002 (No)→S1006). In the meantime, in terms of the software that requires the permission of the user, the function restriction flag controlling portion 604 transmits an ON instruction of a function restriction flag to the target vehicle (step S1002 (Yes)→step S1003). Further, the notice instruction portion 605 instructs the target vehicle to perform an update permission request (step S1004).

Here, the user of the target vehicle is assumed not to input an update permission. In this case, information indicating that the update permission is input is not transmitted from the target vehicle (step S1005 (No)). On this account, the update instruction portion 606 does not transmit, to the target vehicle, the software that requires the permission of the user. After that, when an IG-OFF signal is received from the target vehicle, the management server 110 finishes the version management process (step S902 (No)→step S915 (Yes)).

(2) Process in Vehicle 120 in Example 1 (First IG-ON State) At the point of time when the vehicle 120 enters the first IG-ON state, the function restriction flag is in an OFF state, so the function restriction is not performed, and the DCM 131 transmits an IG-ON signal to the management server 110 (step S1101 (No)→S1103). Further, at the point of time when the vehicle 120 enters the first IG-ON state, software permitted to be updated is not transmitted from the management server 110 (step S1104 (No)).

In view of this, the installation execution portion 702 reads version information of each software installed in the driving support software storage portion 322 and transmits it to the management server 110 (step S1106).

At this point of time, the version information of each software installed in the driving support software storage portion 322 is latest. On this account, the software that does not require the permission of the user or the ON instruction of the function restriction flag is not transmitted from the management server 110 (step S1107 (No)→S1109 (No)). Further, an instruction of an update permission request is not transmitted from the management server 110 (step S1111 (No)→S1221 (No)→S1107).

Here, a plurality of pieces of software of the latest version (software that does not require the permission of the user for update, and software that requires the permission of the user for update) is assumed to be newly acquired from the management server 110 and stored in the software DB 113.

In this case, the software that does not require the permission of the user is transmitted from the management server 110. On this account, the installation execution portion 702 receives this and updates software that has been already installed in the driving support software storage portion 322 (step S1107 (Yes)→S1108). Further, since an ON instruction of a function restriction flag is transmitted from the management server 110, the restriction portion 703 receives this and turns on the function restriction flag (step S1109 (Yes)→S1110).

Further, since an instruction of an update permission request is transmitted from the management server 110, the notification portion 701 receives this and displays a permission request screen (step S1111 (Yes)→S1112).

Here, the user of the vehicle 120 is assumed not to input an update permission. In this case, the notification portion 701 determines that the user does not input the update permission (step S1201 (No)). Note that, since a function restriction has not been performed yet at this point of time, the restriction portion 703 notifies the user that the function restriction is performed when the vehicle enters an IG-ON state next time (step S1211 (No)→S1212). After that, when the vehicle 120 enters an IG-OFF state, the updating process is finished (step S1221 (Yes)).

(3) Process in Management Server 110 in Example 1 (Second IG-ON State) The following description assumes a case where software of a further latest version is not acquired until the vehicle enters a second IG-ON state after the plurality of pieces of software of the latest version is newly acquired and stored in the software DB 113 in the first IG-ON state.

In this case, no software of the further latest version is stored in the software DB 113, and a second IG-ON signal is received from the target vehicle (step S901 (No)→S902 (Yes)).

At this point of time, there is no software permitted to be updated. Further, version information of each software installed in the driving support software storage portion 322 is transmitted from the target vehicle (step S903 (No) →S905).

The management server 110 does not transmit the software that requires the permission of the user to the target vehicle in the first IG-ON state. On this account, version information of the software that requires the permission of the user, among the version information acquired from the target vehicle, is not latest (step S906 (No)→S907 (No) →S909 (Yes)).

Further, the management server 110 has transmitted, to the target vehicle, the ON instruction of the function restriction flag for the software in the first IG-ON state, so the management server 110 does not transmit the ON instruction of the function restriction flag here (step S910 (Yes)). In the meantime, the notification portion 701 instructs the target vehicle to perform the update permission request again (step S912).

Note that, in a case where the user inputs an update permission in the second IG-ON state, the software permitted to be updated is transmitted and the user information DB 114 is rewritten (step S913 (Yes)→S914). In the meantime, in a case where the user does not input the update permission in the second IG-ON state, either, the software is not transmitted and the user information DB 114 is not rewritten (step S913 (No)).

When a second IG-OFF signal is received after that, the version management process on the target vehicle is finished (step S915 (Yes)).

(4) Process in Vehicle 120 in Example 1 (Second IG-ON State) At the point of time when the vehicle 120 enters the second IG-ON state, the function restriction flag is in an ON state in terms of the software that requires the permission of the user. Because of this, when the second IG-ON state is established, the restriction portion 703 performs a function restriction (step S1101 (Yes)→S1102). After that, the DCM 131 transmits an IG-ON signal to the management server 110 (step S1103). Note that, at this point of time, no software permitted to be updated is transmitted from the management server 110 (step S1104 (No)).

The installation execution portion 702 reads version information of each software installed in the driving support software storage portion 322 and transmits it to the management server 110 (step S1106).

Version information of software about which the update permission has not been input in the first IG-ON state, among the version information transmitted to the management server 110, is not latest. On this account, an instruction of an update permission request is transmitted from the management server 110. Note that the ON instruction of the function restriction flag for the software has been already transmitted from the management server 110 in the first IG-ON state, and therefore, is not transmitted here (step S1107 (No)→S1109 (No)→S1111 (Yes)).

The notification portion 701 that receives the instruction of the update permission request displays a permission request screen for update so as to receive an input of an update permission from the user.

Here, the notification portion 701 is assumed to receive the input of the update permission from the user. In this case, the notification portion 701 transmits, to the management server 110, information indicating that the update permission has been input (step S1201 (Yes)→S1202). Further, the installation execution portion 702 receives software permitted to be updated from the management server 110, and updates software that has been already installed in the driving support software storage portion 322 (step S1203→S1204). Further, the restriction portion 703 resets the function restriction that is being performed so as to turn off the function restriction flag, and the installation execution portion 702 transmits an update completion notice to the management server 110 (step S1205→S1206). After that, when the vehicle 120 enters an IG-OFF state, the updating process is finished (step S1221 (Yes)).

Note that, in a case where the user does not input the update permission in the second IG-ON state, either, the function restriction is continued until the vehicle 120 enters the IG-OFF state (step S1201 (No)→S1211 (Yes)→S1221 (Yes)).

<11.2 Example 2> Example 2 deals with a scene in which: a plurality of pieces of software of a latest version is newly acquired and stored in the software DB 113 in an IG-OFF state, but an update is not permitted in a first IG-ON state; and a function restriction is performed in a second IG-ON state. Note that, similarly to Example 1, the plurality of pieces of software of the latest version includes software that does not require a permission of the user and software that requires the permission of the user.

(1) Process in Management Server 110 in Example 2 (First IG-ON State) In a case of Example 2, before the target vehicle enters a first IG-ON state, the plurality of pieces of software of the latest version is newly acquired and stored in the software DB 113 (step S901 (Yes)). In this case, the connection state management portion 601 determines whether or not the target vehicle is in the IG-ON state (step S1001).

At this point of time, the target vehicle is not in the IG-ON state, so the connection state management portion 601 determines whether or not the portable terminal is in a connected state (step S1001 (No)→S1011 (Yes)→S1012). If the portable terminal is in a non-connected state, the connection state management portion 601 waits for an IG-ON signal being transmitted from the target vehicle (step S1012 (No)→S902).

Here, when the target vehicle enters the first IG-ON state, the connection state management portion 601 receives an IG-ON signal (step S902 (Yes)). At this point of time, there is no software permitted to be updated. Further, version information of each software installed in the driving support software storage portion 322 is transmitted from the target vehicle (step S903 (No)→S905).

Here, since the plurality of pieces of software of the latest version has been already stored in the software DB 113, the software type determination portion 603 determines that the version information thus acquired is not latest (step S906 (No)).

Among the plurality of pieces of software of the latest version that has been already stored in the software DB 113, the software that does not require the permission of the user is transmitted by the update instruction portion 606 to the target vehicle. Further, the update instruction portion 606 rewrites the user information DB 114 (step S907 (Yes)→S908).

Further, in terms of the software that requires the permission of the user, an ON instruction of a function restriction flag has not been transmitted yet. On this account, the function restriction flag controlling portion 604 transmits, to the target vehicle, the ON instruction of the function restriction flag for the software (step S909 (Yes)→S910 (No)→S911). Further, the notice instruction portion 605 instructs the target vehicle to perform an update permission request in terms of the software (step S912).

Here, the notification portion 701 is assumed not to receive, from the target vehicle, information indicating that an update permission is input (step S913 (No)).

In this case, the update instruction portion 606 does not transmit, to the target vehicle, the software that requires the permission of the user. After that, when an IG-OFF signal is received from the target vehicle, the management server 110 finishes the version management process (step S915 (Yes)).

(2) Process in Vehicle 120 in Example 2 (First IG-ON State) At the point of time when the vehicle 120 enters the first IG-ON state, all function restriction flags are in an OFF state. Accordingly, the function restriction is not performed, and the DCM 131 transmits an IG-ON signal to the management server 110 (step S1101 (No)→S1103). Further, at the point of time of the first IG-ON state, no software permitted to be updated is transmitted from the management server 110 (step S1104 (No)).

In view of this, the installation execution portion 702 reads version information of each software installed in the driving support software storage portion 322 and transmits it to the management server 110 (step S1106).

At this point of time, the plurality of pieces of software of the latest version has been already stored in the software DB 113 of the management server 110. Accordingly, software that does not require the permission of the user is transmitted from the management server 110, and an ON instruction of a function restriction flag is transmitted in terms of software that requires the permission of the user. On this account, the installation execution portion 702 updates the software that does not require the permission of the user. Further, the function restriction flag is turned on in terms of the software that requires the permission of the user (step S1107 (Yes)→S1108→81109 (Yes)→S1110).

Further, an instruction of an update permission request for the software that requires the permission of the user is transmitted from the management server 110, so the notification portion 701 displays a permission request screen (step S1111 (Yes)→S1112).

Here, the user is assumed not to input an update permission. At this point of time, the function restriction has not been performed yet, so the notification portion 701 notifies the user that the function restriction is performed when the IG-ON state is established next time (step S1201 (No)→S1211 (No)→S1212). After that, when the vehicle 120 enters an IG-OFF state, the updating process is finished (step S1221 (Yes)).

Note that a process in the management server 110 in Example 2 (in a second IG-ON state) and a process in the vehicle 120 in Example 2 (in the second IG-ON state) are the same as those in Example 1, so descriptions thereof are omitted here.

<11.3 Example 3> Example 3 deals with a scene in which: in an IG-OFF state, a plurality of pieces of software of a latest version is newly stored in the software DB 113, and the user input an update permission via the portable terminal 140; and when the vehicle enters an IG-ON state, software is updated.

(1) Process in Management Server 110 in Example 3 In a case of Example 3, before the target vehicle enters the IG-ON state, the plurality of pieces of software of the latest version is newly acquired and stored in the software DB 113. On this account, the connection state management portion 601 determines whether or not the target vehicle is in the IG-ON state (step S901 (Yes)→S1001).

At this point of time, the target vehicle is not in the IG-ON state, so the connection state management portion 601 determines whether or not the portable terminal 140 is in a connected state (step S1001 (No)→S1011 (Yes)→S1012).

Here, it is assumed that the portable terminal 140 is in the connected state. In this case, the notice instruction portion 605 instructs the portable terminal to perform an update permission request for software that requires a permission of the user among the pieces of software of the latest version (step S1012 (Yes)→S1013).

Here, it is assumed that the notice instruction portion 605 receives, from the portable terminal, information indicating that an update permission has been input (step S1014 (Yes)). In this case, the update instruction portion 606 recognizes that the update has been already permitted by the user in terms of the software that requires the permission of the user (step S1015).

After that, when the target vehicle enters the IG-ON state, the connection state management portion 601 receives an IG-ON signal from the target vehicle (step S902 (Yes)). At this point of time, there is the software that has been already permitted to be updated via the portable terminal 140, so the update instruction portion 606 transmits, to the target vehicle, the software recognized to be permitted to be updated. Further, the update instruction portion 606 rewrites the user information 410 of the user information DB 114 (step S903 (Yes)→S904).

Further, the update instruction portion 606 acquires, from the target vehicle, version information of each software installed in the driving support software storage portion 322 (step S905). At this point of time, the software that requires the permission of the user has been already transmitted to the vehicle 120, so version information of the software that requires the permission of the user is latest. In the meantime, software that does not require the permission of the user has not been transmitted to the vehicle 120 yet, so version information of the software that does not require the permission of the user is not latest (step S906 (No)).

On this account, the update instruction portion 606 transmits, to the target vehicle, the software that does not require the permission of the user, and rewrites the user information DB 114 (step S907 (Yes)→S908). Note that, at this point of time, the software that requires the permission of the user has been already transmitted (step S909 (No)). Accordingly, when an IG-OFF signal is received from the target vehicle, the version management process for the target vehicle is finished (step S915 (Yes)).

(2) Process in Vehicle 120 in Example 3 (First IG-ON State) At the point of time when the vehicle 120 enters the first IG-ON state, all function restriction flags are in an OFF state. Accordingly, the function restriction is not performed, and the DCM 131 transmits an IG-ON signal to the management server 110 (step S1101 (No)→S1103).

Here, in a case of Example 3, at the point of time when the IG-ON state is established, software permitted to be updated is transmitted from the management server 110. Accordingly, when the installation execution portion 702 receives the software permitted to be updated the installation execution portion 702 updates software that has been already installed in the driving support software storage portion 322 (step S1104 (Yes)→S1105).

After that, the installation execution portion 702 transmits version information of each software installed in the driving support software storage portion 322 to the management server 110 (step S1106). At this point of time, the software that requires the permission of the user has been already updated to the latest version, but the software that does not require the permission of the user is not updated.

Accordingly, the software that does not require the permission of the user is transmitted from the management server 110. When the installation execution portion 702 receives the software that does not require the permission of the user, the installation execution portion 702 updates corresponding software that has been already installed in the driving support software storage portion 322 (step S1107 (Yes)→S1108).

Note that an ON instruction of a function restriction flag and an instruction of an update permission request for the software that requires the permission of the user are not transmitted from the management server 110 (step S1109 (No)→S1111 (No)→S1221).

After that, when the vehicle 120 enters an IG-OFF state, the updating process is finished (step S1221 (Yes)).

(3) Process in Portable Terminal 140 in Example 3 In a case of Example 3, after the update permission portion 141 of the portable terminal 140 establishes a connection with the management server 110, an instruction of an update permission request for software that requires a permission of the user is transmitted from the management server 110 (step S1301→S1302 (Yes)).

When the update permission portion 141 receives the instruction of the update permission request, the update permission portion 141 displays a permission request screen so as to receive an input of an update permission from the user (step S1303). When the user inputs the update permission, the update permission portion 141 transmits, to the management server 110, information indicating that the input of the update permission has been performed (step S1304 (Yes)→S1305).

After that, when a stop instruction of the update permission program is input by the user, the update permission portion 141 cuts the connection with the management server 110, so as to finish the update permission process (step S1306 (Yes)→S1307).

<12. Description of Other Processes Executed in Management Server> Next will be described other processes (a user management process by the user management portion 112) executed in the management server 110.

Figure 14:
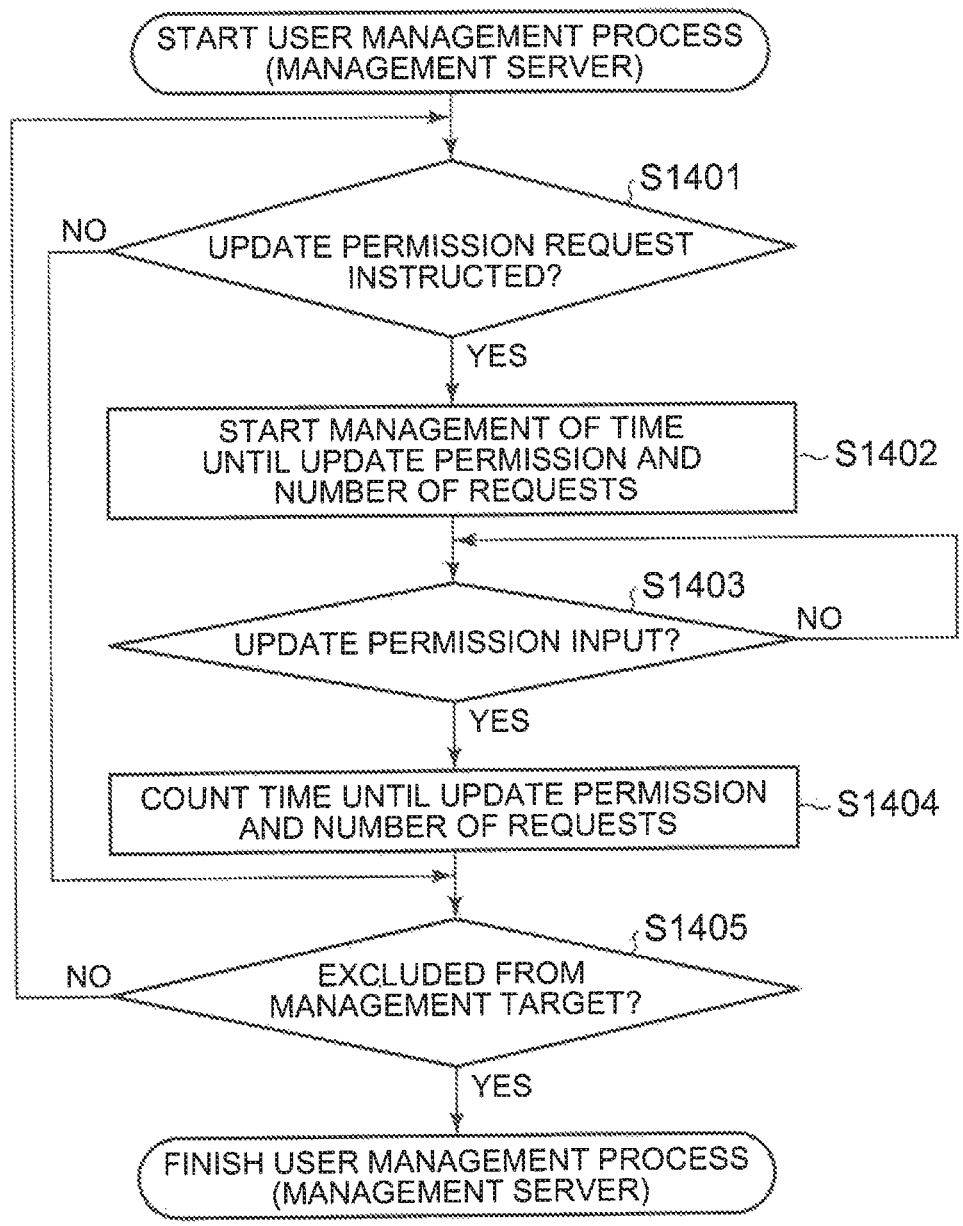
FIG. 14 is a flowchart illustrating a flow of a user management process in the management server.

FIG. 14 is a flowchart illustrating a flow of the user management process executed by the user management portion 112 of the management server 110. The flowchart illustrated in FIG. 14 is executed at the same time as the IG-ON state management process for the target vehicle, the connection state management process for the target portable terminal, and the version management process.

In step S1401, the user management portion 112 determines whether or not the notice instruction portion 605 instructs the target vehicle to perform an update permission request. In step S1401, when it is determined that the instruction is not performed, the process proceeds to step S1405.

In the meantime, when it is determined that the instruction is performed, the process proceeds to step S1402. In step S1402, the user management portion 112 starts management of time until the user inputs an update permission in terms of software about which the notice instruction portion 605 instructs to perform the update permission request. Further, the user management portion 112 starts management of the number of times of the instruction performed by the notice instruction portion 605 to instruct the execution of the update permission request.

In step S1403, the user management portion 112 determines whether or not the user inputs the update permission in terms of the software about which the notice instruction portion 605 instructs to perform the update permission request.

When it is determined, in step S1403, that the update permission is not input, the user management portion 112 waits until the update permission is input. In the meantime, when it is determined that the update permission is input, the process proceeds to step S1404.

In step S1404, the user management portion 112 counts the time taken until the user inputs the update permission and the number of times of the instruction performed by the notice instruction portion 605 to instruct to perform the update permission request during the time.

In step S1405, the user management portion 112 determines whether or not the target vehicle is excluded from the management target. When it is determined that the target vehicle is not excluded from the management target, the process returns to step S1401. In the meantime, when it is determined that the target vehicle is excluded from the management target, the user management process on the target vehicle is finished.

<13. Summary> As is apparent from the above description, the software management system for the vehicle according to the present embodiment is configured as follows.—When software of a latest version is acquired by the management server and stored in the software DB in terms of software installed in the automatic driving or driving support system, it is determined that an update is required.—When it is determined that the update is required, it is determined whether or not the software of the latest version, newly acquired, is software that requires a permission of a user for the update.—When it is determined that the software is the software that requires the permission of the user, an ON instruction of a function restriction flag for restricting an operation of part or all of an automatic driving function or a driving support function related to the software is transmitted to the vehicle.—When an IG-ON state is established again after the function restriction flag is turned on, a process of restricting the operation of part or all of the automatic driving function or the driving support function related to the software is started.—The user of the vehicle inputs an update permission about the software so as to complete the update by the software, and hereby, the function restriction is reset.

According to the above configuration, when the user actively performs the input of the update permission, the user can obtain an incentive to avoid such a situation that the operation of part or all of the automatic driving function or the driving support function is restricted (or to shorten a time during which the operation is restricted). Hereby, the user performs the input of the update permission actively. As a result, the software management system for the vehicle according to the present embodiment makes it possible to realize an early update of software that requires a permission of a user at the time of the update.

[Second Embodiment] In the first embodiment, when software that requires a permission of the user is stored in the software DB 113 and it is determined that the software requires an update, the management server 110 transmits, to the vehicle, an ON instruction of its function restriction flag. Further, when the ON instruction of the function restriction flag is received from the management server 110, the function restriction flag is turned on in the vehicle 120.

In this regard, in the second embodiment, an ON instruction of a function restriction flag from a management server 110 to a vehicle 120 is not performed. Meanwhile, in the second embodiment, when it is determined that the user does not input an update permission for software that requires a permission of a user, the vehicle 120 turns on its function restriction flag. The following describes the second embodiment mainly about differences from the first embodiment.

<1. Description of Processes Executed in Management Server> First described is a version management process among processes performed in the management server 110.

Figure 15:
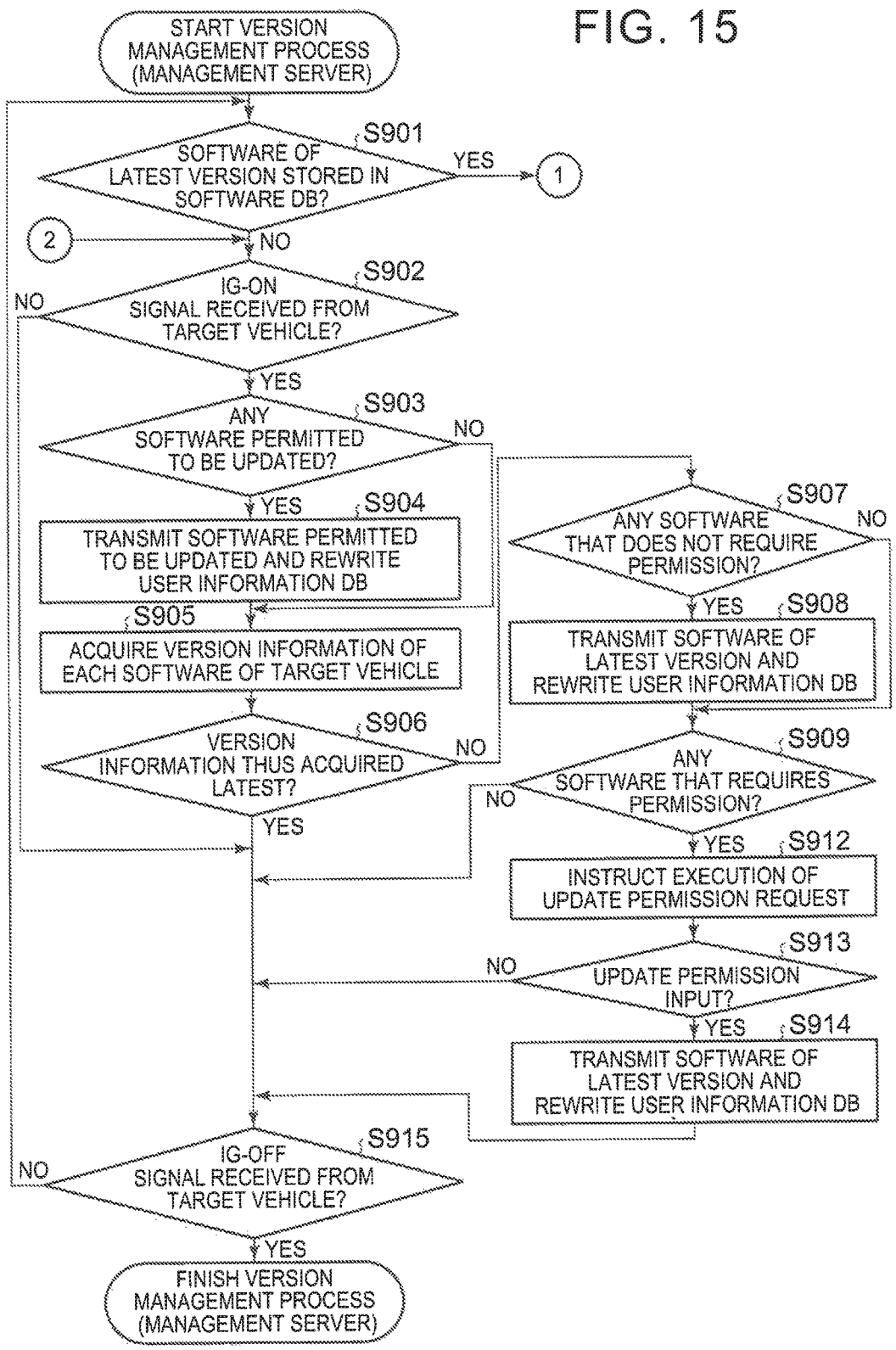
FIG. 15 is a flowchart illustrating a flow of a version management process in the management server.
Figure 16:
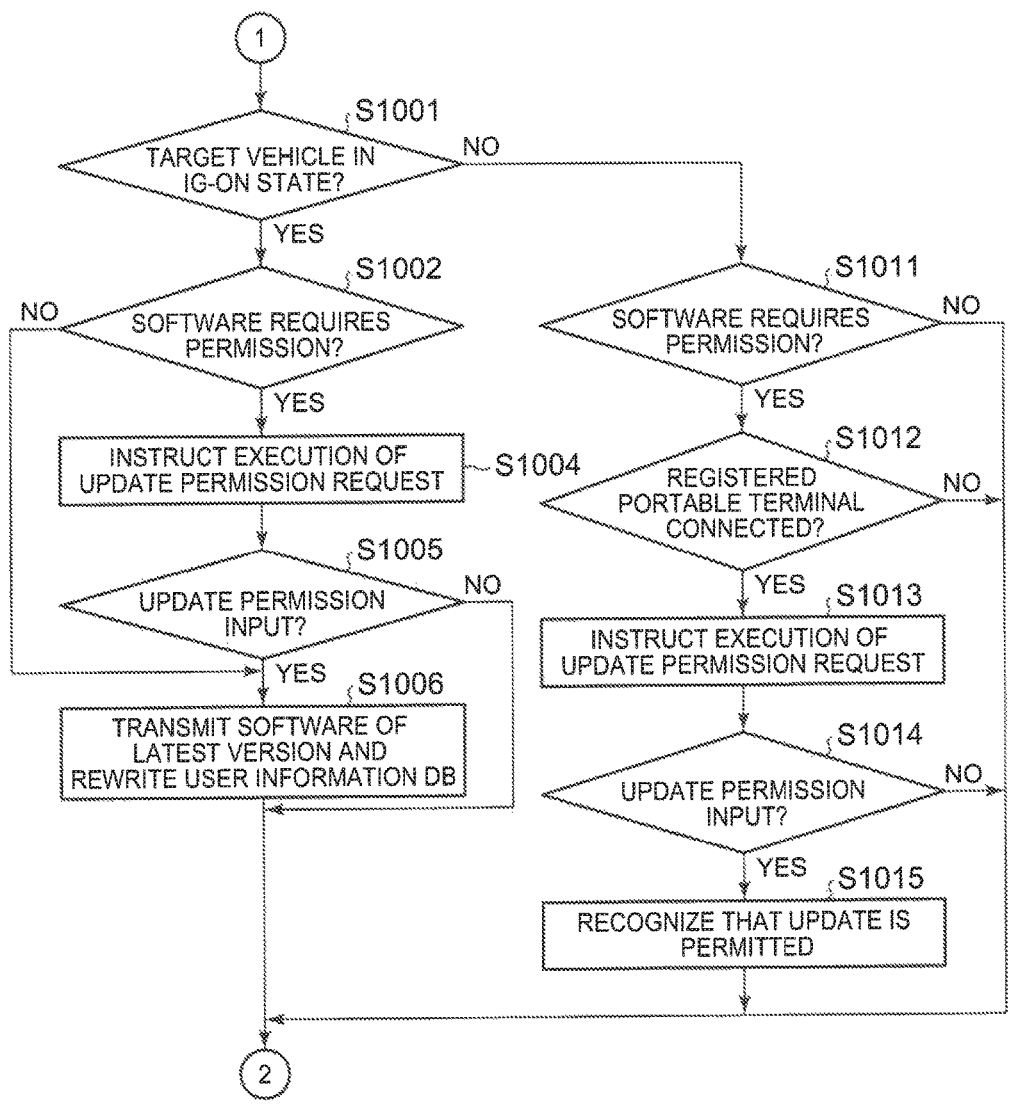
FIG. 16 is a flowchart illustrating a flow of the version management process in the management server.

FIGS. 15 and 16 are flowcharts each illustrating a flow of the version management process. The flowchart illustrated in FIG. 15 is different from the flowchart illustrated in FIG. 9 in that FIG. 15 does not include the processes of steps S910, S911. Similarly, the flowchart illustrated in FIG. 16 is different from the flowchart illustrated in FIG. 10 in that FIG. 16 does not include the process of step S1003. This is because, in the present embodiment, an ON instruction of a function restriction flag from the management server 110 to the vehicle 120 is not performed.

Figure 17:
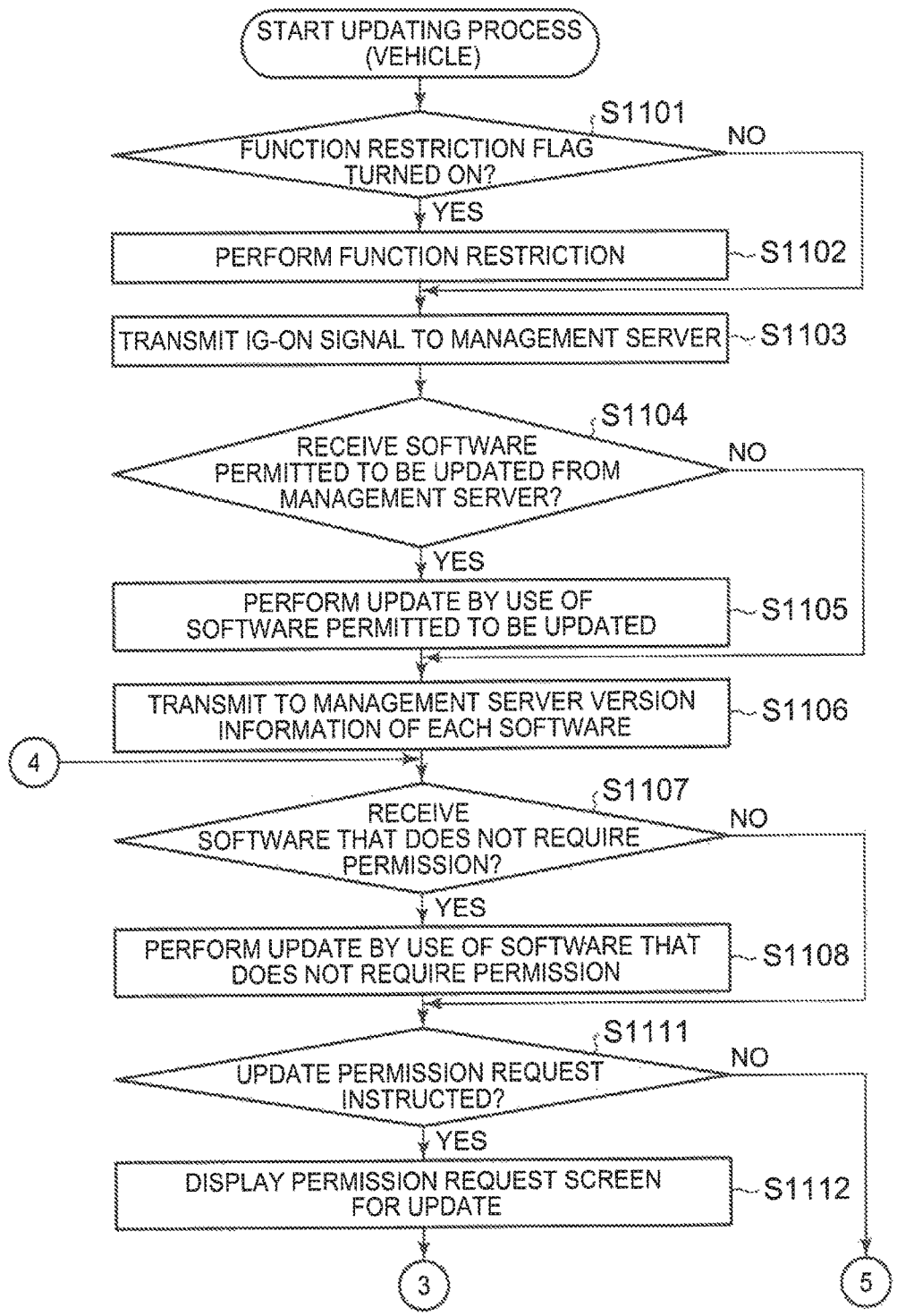
FIG. 17 is a flowchart illustrating a flow of an updating process in the vehicle.
Figure 18:
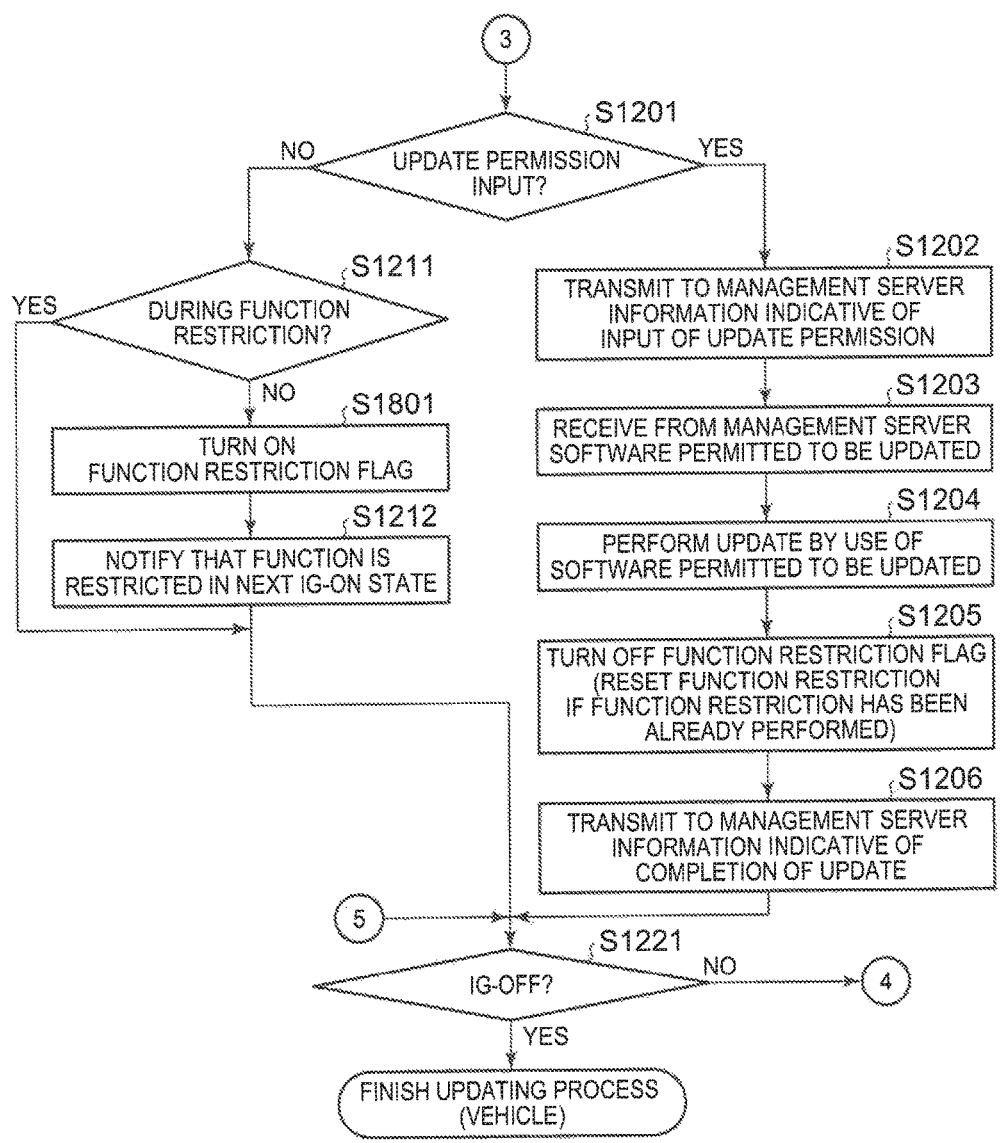
FIG. 18 is a flowchart illustrating a flow of the updating process in the vehicle.

<2. Description of Process Executed in Vehicle> Next will be described a process (an updating process) executed in the vehicle 120. FIGS. 17 and 18 are flowcharts each illustrating a flow of the updating process in the vehicle.

The flowchart illustrated in FIG. 17 is different from the flowchart illustrated in FIG. 1*i* in that FIG. 17 does not include the processes of steps S1109, S1110. This is because, in the present embodiment, an ON instruction of a function restriction flag from the management server 110 to the vehicle 120 is not performed.

Further, the flowchart illustrated in FIG. 18 is different from the flowchart illustrated in FIG. 12 in that a function restriction flag is turned on in step S1801 in FIG. 18. In the present embodiment, an instruction of an update permission request is received from the management server 110 and a notification portion 701 displays a permission request screen. When it is determined that a user does not input an update permission in that state, a restriction portion 703 turns on the function restriction flag.

As such, in the present embodiment, the vehicle 120 controls ON or OFF of the function restriction flag based on whether or not the update permission is input by the user in the vehicle 120.

<3. Summary> As is apparent from the above description, the software management system for the vehicle according to the present embodiment is configured as follows.—When software of a latest version is acquired by the management server and stored in the software DB in terms of software installed in the automatic driving or driving support system, it is determined that an update is required.—When it is determined that the update is required, it is determined whether or not the software of the latest version, newly acquired, is software that requires a permission of a user.— When it is determined that the user does not permit the update for the software that requires the permission of the user, a function restriction flag for restricting an operation of part or all of an automatic driving function or a driving support function related to the software is turned on.—When an IG-ON state is established again after the function restriction flag is turned on, a process of restricting the operation of part or all of the automatic driving function or the driving support function related to the software is started.—The user of the vehicle inputs an update permission about the software so as to complete the update by the software, and hereby, the function restriction is reset.

According to the above configuration, when the user actively performs the input of the update permission, the user can obtain an incentive to avoid such a situation that the operation of part or all of the automatic driving function or the driving support function is restricted (or to shorten a time during which the operation is restricted). Hereby, the user performs the input of the update permission actively. As a result, the software management system for the vehicle according to the present embodiment makes it possible to realize an early update of software that requires a permission of a user at the time of the update.

[Third Embodiment] In the first and second embodiments, the software that does not require the permission of the user is transmitted to the vehicle, triggered by the vehicle entering the IG-ON state. Further, software that requires the permission of the user is transmitted to the vehicle, triggered by the user inputting an update permission.

In this regard, in the third embodiment, it is determined whether or not a state of a vehicle is a state suitable for update, and when it is determined the vehicle is in the state suitable for update, software of a latest version is transmitted to the vehicle from a management server. This makes it possible to disperse a communication load of the vehicle. The following describes the third embodiment mainly about differences from the first embodiment.

<1. Description of Process Executed in Management Server> First described is a flow of processes executed by a management server 110 (a version management process, a software transmission process).

Figure 19:
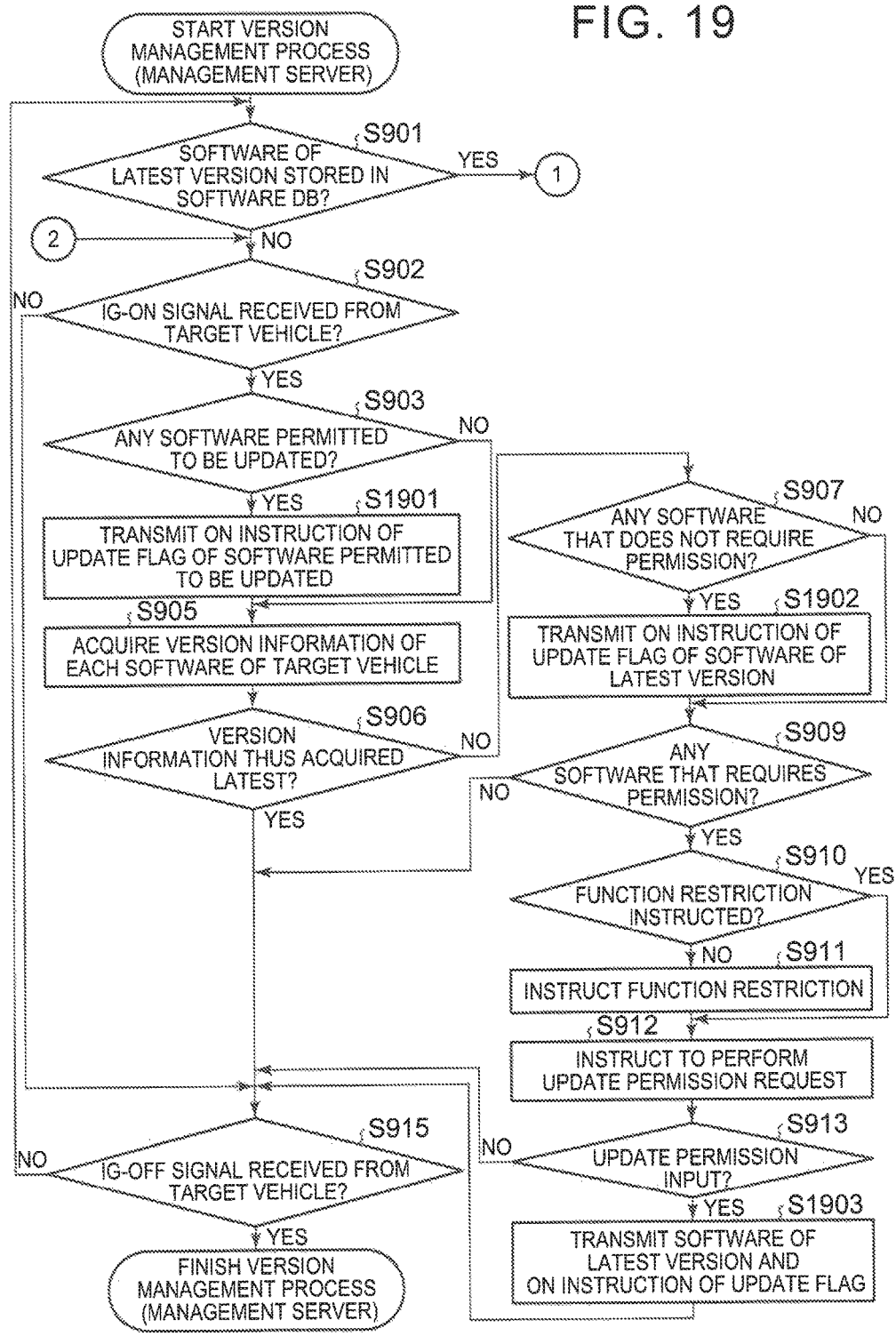
FIG. 19 is a flowchart illustrating a flow of a version management process in the management server.
Figure 20:
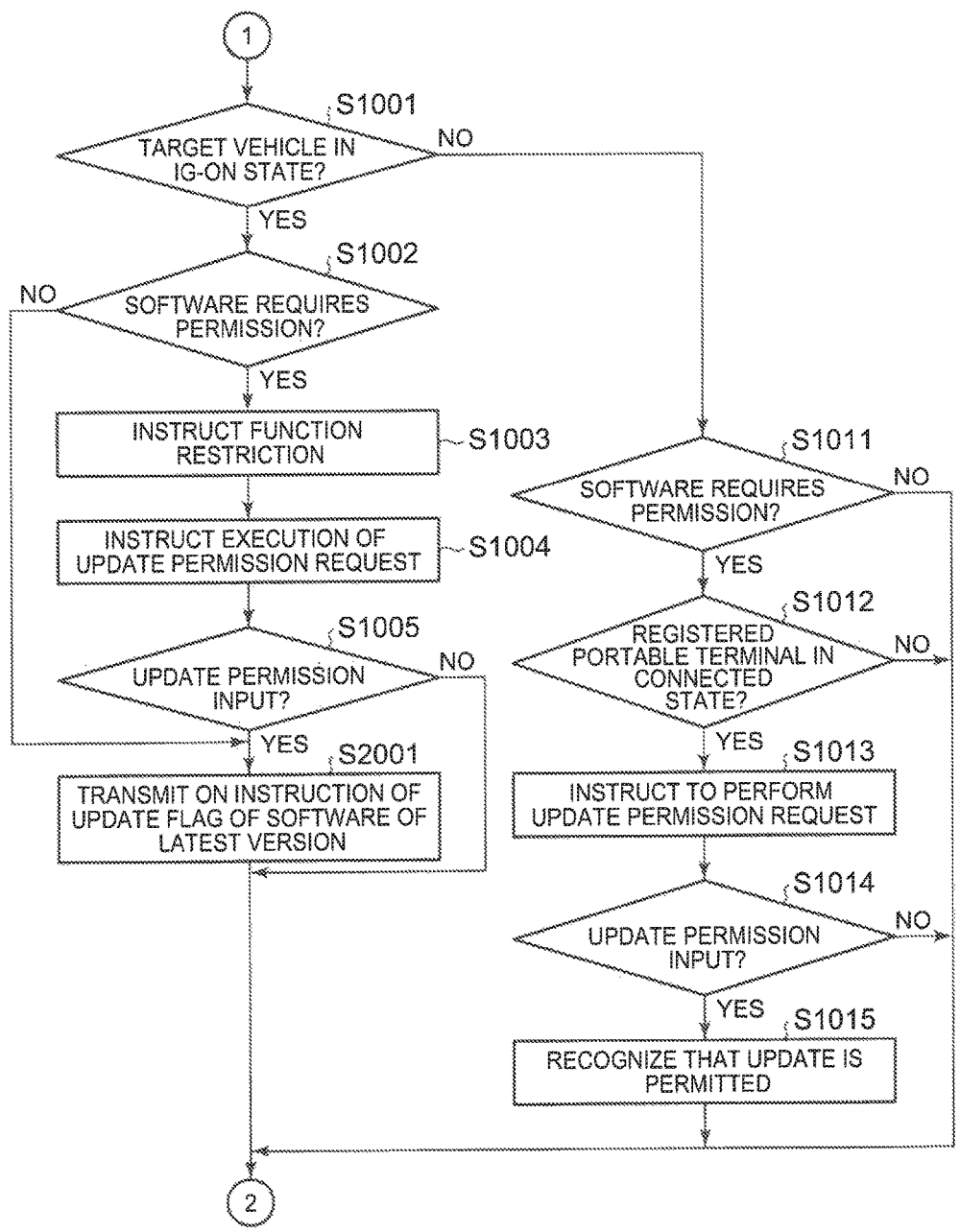
FIG. 20 is a flowchart illustrating a flow of the version management process in the management server.

(1) Version Management Process FIGS. 19 and 20 are flowcharts each illustrating a flow of the version management process. The flowchart illustrated in FIG. 19 is different from the flowchart illustrated in FIG. 9 in that process contents of steps S1901, S1902, S1903 in FIG. 19 are different from process contents of steps S904, S908, S914 in FIG. 9. Note that, in the present embodiment, an "update flag" of software is stored in driving support software information 510. The update flag is a flag indicating a state where software installed in a driving support system 132 can be updated. The "update flag" stored in the driving support software information 510 is turned on when an ON instruction of the update flag is received from the management server 110, and when corresponding software is updated to its latest version, the "update flag" is turned off.

In step S1901, an update instruction portion 606 transmits, to a target vehicle, an ON instruction of an update flag of software permitted to be updated.

In step S1902, the update instruction portion 606 transmits, to the target vehicle, an ON instruction of an update flag of software that does not require a permission of the user.

In step S1903, the update instruction portion 606 transmits, to the target vehicle, an ON instruction of an update flag of software that requires the permission of the user.

Similarly, the flowchart illustrated in FIG. 20 is different from the flowchart illustrated in FIG. 10 in that a process content of step S2001 in FIG. 20 is different from a process content of step S1006 in FIG. 10.

In step S2001, the update instruction portion 606 transmits, to the target vehicle, an ON instruction of an update flag of software that requires a permission of the user.

As such, in the present embodiment, even if the management server 110 enters a state where the software is transmittable to the target vehicle, the management server 110 does not transmit the software immediately, but transmits the ON instruction of the update flag of the software to the target vehicle.

Hereby, in the target vehicle, when it is determined the vehicle 120 is in a state suitable for update, it is possible to perform a transmission request to the management server 110 in terms of the software in which the update flag is turned on.

That is, when the vehicle 120 enters a state suitable for reception and update, the reception and update of the software is performable.

Figure 21:
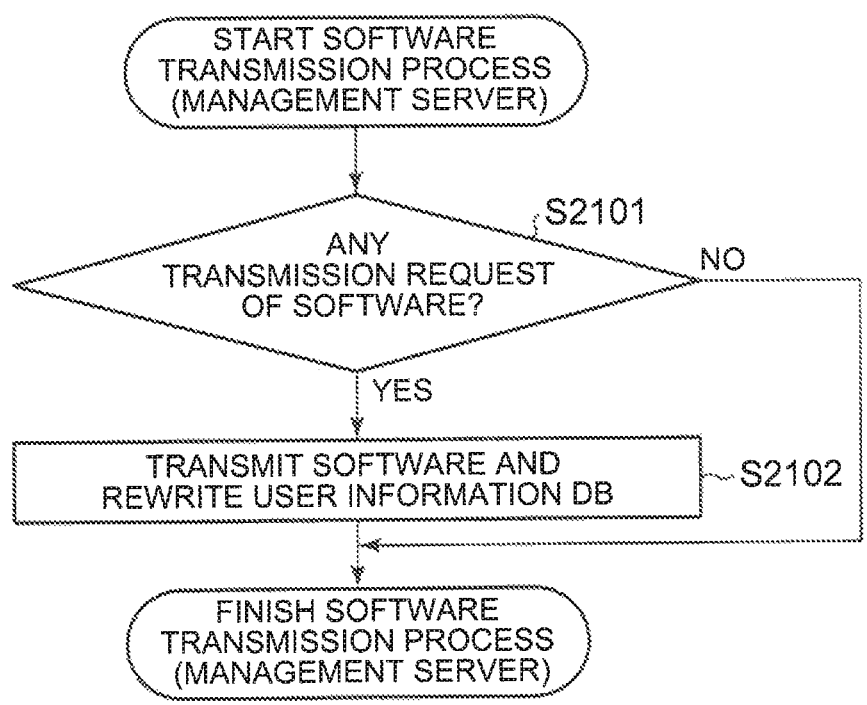
FIG. 21 is a flowchart illustrating a flow of a software transmission process in the management server.

(2) Software Transmission Process FIG. 21 is a flowchart illustrating a flow of a software transmission process performed by a software management portion 111 of the management server 110. The software transmission process illustrated in FIG. 21 is executed at the same time as the version management process.

In step S2101, the update instruction portion 606 determines whether or not a transmission request of software is received from the target vehicle. In step S2101, when it is determined that the transmission request of the software is received, the process proceeds to step S2102.

In step S2102, the update instruction portion 606 transmits, to the target vehicle, the software for which the transmission request is received, and rewrites the user information DB 114.

<2. Description of Process Executed in Vehicle> Next will be described processes (an update preparation process, an updating process) executed in the vehicle 120.

Figure 22:
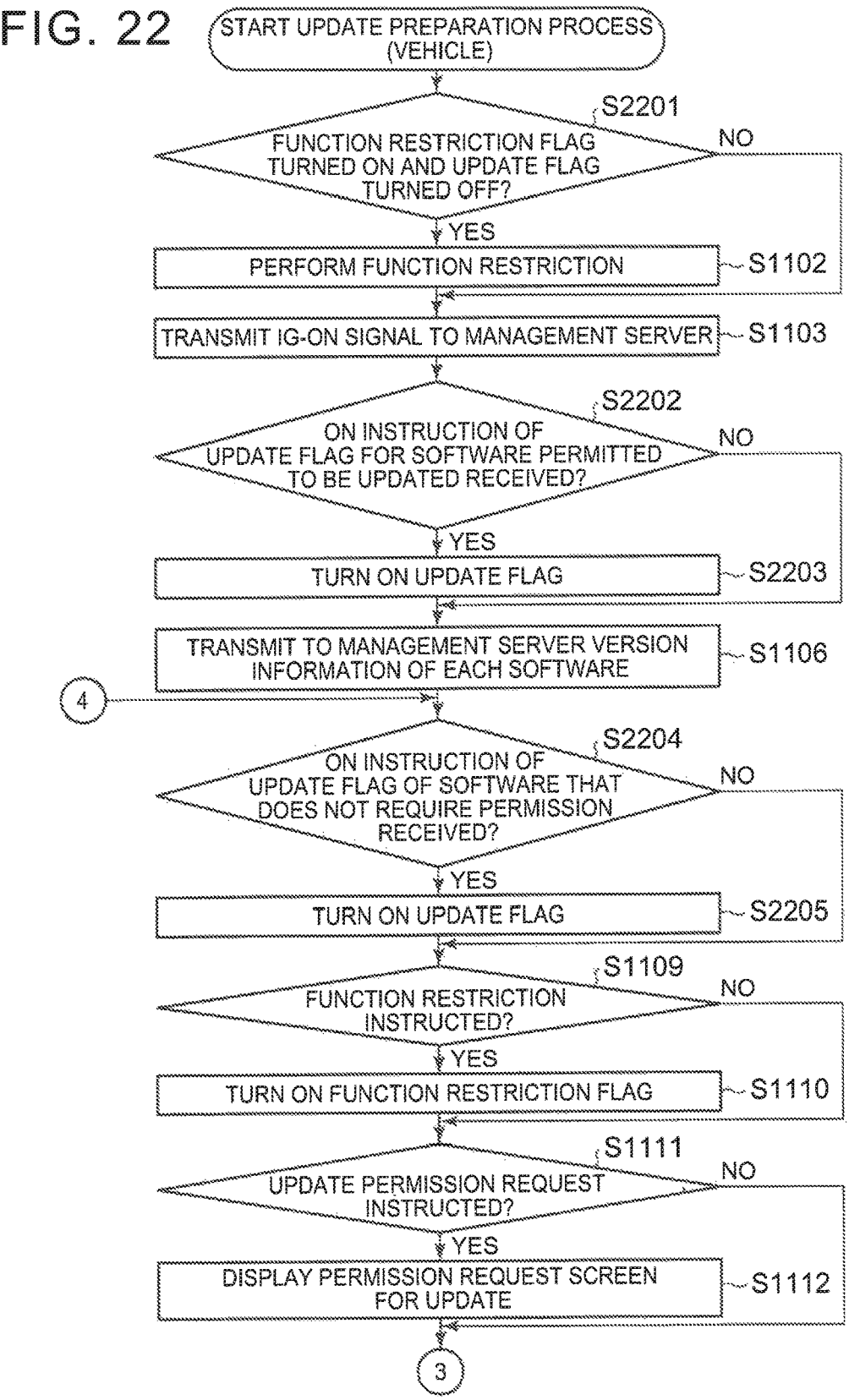
FIG. 22 is a flowchart illustrating a flow of an update preparation process in the vehicle.

(1) Update Preparation Process FIGS. 22 and 23 are flowcharts each illustrating a flow of the update preparation process in the vehicle 120.

The flowchart illustrated in FIG. 22 is different from the flowchart illustrated in FIG. 11 in that process contents of steps S2201 to S2205 in FIG. 22 are different from process contents of steps S1101, S1104, S1105, S1107, S1108 in FIG. 11.

In step S2201, a restriction portion 703 refers to driving support software information 510 and determines whether or not there is software in which the function restriction flag is in an ON state and an update flag is in an OFF state.

In step S2201, when it is determined that there is the software in which the function restriction flag is in the ON state and the update flag is in the OFF state, the process proceeds to step S1102. In the meantime, in step S2201, when it is determined that the function restriction flag is in the ON state and there is no software in which the update flag is in the OFF state, the process proceeds to step S1103.

The software in which the function restriction flag is in the ON state and the update flag is in the OFF state is software which is determined to require the permission of a user, so that its function restriction flag is turned on, but for which the user does not input an update permission.

Note that the software in which the function restriction flag is in the ON state and the update flag is in the ON state is software which is determined to require the permission of the user, so that its function restriction flag is turned on, and for which the user inputs an update permission. When the user inputs the update permission, the update flag is turned on, but the update is not performed until a state suitable for update is established, so the function restriction flag remains in the ON state. In this case, the function restriction is not performed.

In step S2202, the installation execution portion 702 determines whether or not an ON instruction of the update flag of the software permitted to be updated is received. When it is determined that the ON instruction is received in step S2202, the installation execution portion 702 turns on the update flag of the software permitted to be updated, in step S2203.

In step S2204, the installation execution portion 702 determines whether or not an ON instruction of an update flag of the software that does not require the permission of the user is received. When it is determined, in step S2204, that the ON instruction is received, the installation execution portion 702 turns on the update flag of the software that does not require the permission of the user, in step S2205.

Similarly, the flowchart illustrated in FIG. 23 is different from the flowchart illustrated in FIG. 12 in that process contents of steps S2301, S2302 in FIG. 23 are different from process contents of steps S1203, S1204 in FIG. 12. Further, FIG. 23 does not include the processes of steps S1205, S1206 in FIG. 12.

In step S2301, the installation execution portion 702 determines whether or not an ON instruction of an update flag of software permitted to be updated is received from the management server 110.

When it is determined, in step S2301, that the ON instruction is received, the installation execution portion 702 turns on the update flag of the software permitted to be updated, in step S2302.

(2) Updating Process FIG. 24 is a flowchart illustrating a flow of an updating process in the vehicle 120. The updating process illustrated in FIG. 24 is performed at the same time as the update preparation process (FIG. 22, FIG. 23). Note that, the execution of the update preparation process is started with the proviso that the vehicle 120 enters an IG-ON state, whereas the updating process may be started even if the vehicle is not in the IG-ON state, provided that the vehicle is communicable with the management server 110.

In step S2401, the installation execution portion 702 determines whether or not the vehicle 120 is in a state suitable for update. When it is determined, in step S2401, that the vehicle 120 is in the state suitable for update, the process proceeds to step S2402. Note that the state suitable for update indicates, for example, a state where the vehicle 120 stops, a state where the vehicle 120 is parked in a parking lot or the like, or a state where the vehicle 120 is being charged in a case where the vehicle 120 is an electric vehicle.

In step S2402, the installation execution portion 702 determines whether or not there is software in which an update flag is in an ON state. In step S2402, when it is determined that there is the software in which the update flag is in the ON state, the process proceeds to step S2403.

In step S2403, the installation execution portion 702 performs a transmission request of a latest version to the management server 110 in terms of the software in which the update flag is turned on. In step S2404, when software of the latest version is transmitted from the management server 110 in response to the transmission request, the installation execution portion 702 receives this. Further, the installation execution portion 702 updates software that has been already installed in a driving support software storage portion 322, by use of the software thus received.

In step S2405, the restriction portion 703 turns off the function restriction flag. Note that, in a case where the function restriction has been already performed, the restriction portion 703 resets the function restriction (that is, the function restriction is reset at a timing when the function restriction flag is turned off).

In step S2406, the installation execution portion 702 transmits an update completion notice to the management server 110.

<3. Summary> As is apparent from the above description, the software management system for the vehicle according to the present embodiment is configured as follows.—When software of a latest version is acquired by the management server and stored in the software DB in terms of software installed in the automatic driving or driving support system, it is determined that an update is required.—When it is determined that the update is required, it is determined whether or not the software of the latest version, newly acquired, is software that requires a permission of a user at the time of the update.—When it is determined that the software is the software that requires the permission of the user, an ON instruction of a function restriction flag for restricting an operation of part or all of an automatic driving function or a driving support function related to the software is transmitted to the vehicle.—When an IG-ON state is established again after the function restriction flag enters an ON state, a process of restricting the operation of part or all of the automatic driving function or the driving support function related to the software is started.—The user of the vehicle inputs an update permission about the software so as to complete the update by the software, and hereby, the function restriction is reset.—In terms of software that does not require the permission of the user among the software of the latest version thus newly acquired, when the vehicle enters in the IG-ON state, an ON instruction of an update flag is transmitted to the vehicle. Further, in terms of the software that requires the permission of the user, when the user inputs an update permission, an ON instruction of an update flag is transmitted to the vehicle.—When it is determined that the vehicle enters a state suitable for update, software of a latest version is received from the management server to perform the update in terms of the software in which the update flag is in the ON state.

According to the above configuration, when the user actively performs the input of the update permission, the user can obtain an incentive to avoid such a situation that the operation of part or all of the automatic driving function or the driving support function is restricted (or to shorten a time during which the operation is restricted). Hereby, the user performs the input of the update permission actively. As a result, the software management system for the vehicle according to the present embodiment makes it possible to realize an early update of software that requires a permission of a user at the time of the update.

In addition, according to the above configuration, software related to the automatic driving function or the driving support function can be executed when the vehicle enters a state suitable for update. Hereby, in the software management system for the vehicle according to the present embodiment, it is possible to disperse a communication load of the vehicle.

[Modification] In the first to third embodiments, when the function restriction flag enters the ON state in the present IG-ON state, the function restriction is performed in the next IG-ON state. However, the timing to perform the function restriction is not limited to this. For example, the function restriction may be performed at a timing when the function restriction flag is turned on in the present IG-ON state, or the function restriction may be performed at a timing when the vehicle 120 stops for the first time after the function restriction flag is turned on. In any case, the function restriction should be started at a predetermined timing after the function restriction flag is turned on.

Further, in the first to third embodiments, at a timing when the software acquisition portion 602 newly acquires and stores software of a latest version in the software DB 113, the software type determination portion 603 performs the determination. However, the timing when the software type determination portion 603 performs the determination is not limited to this, and the software type determination portion 603 may perform the determination on a predetermined date and time. Alternatively, in a case where the target vehicle is in the IG-ON state or in a case where the target vehicle is in a communicable state, the software type determination portion 603 may perform the determination.

Further, in the first to third embodiments, the software acquisition portion 602 of the management server 110 functions as an update necessity determination portion. However, the function as the update necessity determination portion may be provided on a vehicle-120 side. However, in this case, every time the software acquisition portion 602 of the management server 110 acquires software of a latest version, the software acquisition portion 602 transmits, to the vehicle 120, information indicating that the software of the latest version is acquired. Alternatively, every time the software acquisition portion 602 of the management server 110 acquires software of a latest version, the software acquisition portion 602 transmits, to the vehicle 120, version information of the software thus acquired.

Hereby, the update necessity determination portion provided on the vehicle-120 side can determine whether or not an update is required in terms of software installed in the driving support ECU 300, based on the information transmitted from the software acquisition portion 602.

Note that, in this case, the software type determination portion 603 of the management server 110 transmits, to the vehicle 120, information about "necessity of permission" of the software. Here, the notification portion 701 and the restriction portion 703 of the version management portion 321 of the driving support ECU 300 operate based on a determination result of the update necessity determination portion and the information about the "necessity of permission" thus transmitted. That is, in a case where the update and the permission are required, the notification portion 701 displays a permission request screen for update so as to receive an input of an update permission, and the restriction portion 703 turns on the function restriction flag. Note that, the operation of the restriction portion 703 is not limited to this, and as described in the second embodiment, when the update permission is not input on the permission request screen, the function restriction flag may be turned on.

Further, in the first to third embodiments, the software of the latest version newly stored in the software DB 113 includes software that requires the permission of the user, and software that does not require the permission of the user. However, all the software of the latest version newly stored in the software DB 113 may be software that requires the permission of the user. In this case, the function of the software type determination portion 603 is unnecessary, and when software of a latest version is acquired by the software acquisition portion 602 and stored in the software DB 113, the function restriction flag controlling portion 604 may transmit, to the target vehicle, an ON instruction of a function restriction flag.

Further, in the first to third embodiments, when the installation execution portion 702 of the vehicle 120 completes the update of the software, the restriction portion 703 turns off the function restriction flag. However, the restriction portion 703 may be configured to turn off the function restriction flag based on an instruction from the management server 110. More specifically, when the update instruction portion 606 of the management server 110 receives an update completion notice from the vehicle 120, the function restriction flag controlling portion 604 may be configured to transmit an OFF instruction of the function restriction flag to the vehicle 120. Hereby, ON and OFF of the function restriction flag in the vehicle 120 are controlled by the management server 110.

Further, in the first to third embodiments, the ON state and the OFF state of the function restriction flag are controlled. However, the function restriction flag may not be used in order to restrict the operation of part or all of the automatic driving function or the driving support function.

For example, in a case where it is determined that an update is required in terms of software related to the automatic driving function or the driving support function and a plurality of predetermined conditions is established at the same time, the operation of part or all of the automatic driving function or the driving support function may be restricted. The plurality of predetermined conditions may include a condition that the update is not permitted by the user, for example. Note that, at this time, the determination on whether or not the update is required in terms of the software related to the automatic driving function or the driving support function may be performed on the management-server-110 side or may be performed on the vehicle-120 side. Similarly, the determination on whether or not the plurality of predetermined conditions is established at the same time may be performed on the management-server-110 side or may be performed on the vehicle-120 side.

Alternatively, in a case where it is determined that the update is required in terms of the software related to the automatic driving function or the driving support function and an instruction of a function restriction is transmitted from the management server 110 to the vehicle 120, when it is determined that the function restriction is started in the vehicle 120, the operation of part or all of the automatic driving function or the driving support function may be restricted. That is, the determination on whether or not the update is required may be performed on the management-server-110 side, and the determination on whether or not the plurality of predetermined conditions is established at the same time may be performed on the management-server-110 side.

Note that the present embodiment is not limited to the configurations described herein, including the configurations in the above embodiments and combinations with other elements. As for these points, the above configurations can be modified without departing from the purpose of the present disclosure, and can be determined appropriately according to its application form.

What is claimed is:

1. A software management system for a vehicle having an automatic driving function or a driving support function, the software management system including a management server that manages software installed in the vehicle, the software management system comprising:
    an update necessity determination portion configured to determine whether or not an update is required in terms of software installed in the vehicle and related to the automatic driving function or the driving support function;
    an update portion configured to update the software related to the automatic driving function or the driving support function when the update necessity determination portion determines that the update is required and the update is permitted by a user; and
    a restriction portion configured to:
        turn on a control flag when the update necessity determination portion determines that the update is required, the control flag enabling a restriction on an operation of part or all of the automatic driving function or the driving support function;
        turn off the control flag when the update portion updates the software related to the automatic driving function or the driving support function;
        start to restrict the operation of part or all of the automatic driving function or the driving support function at a timing when the vehicle enters an IG-ON state when the control flag is turned on and then the vehicle enters an IG-OFF state; and
        reset the restriction at a timing when the control flag is turned off.

2. The software management system according to claim 1, further comprising:
    a notification portion configured to notify the user to permit the update when the update necessity determination portion determines that the update is required.

3. The software management system according to claim 1, wherein the restriction portion turns on the control flag in a case where the update necessity determination portion determines that the update is required, but the update is not permitted by the user.

4. The software management system according to claim 3, wherein the restriction portion turns on the control flag in a case where the update necessity determination portion determines that the update is required, but the user does not input an update permission within a predetermined time after the user is notified to permit the update.

5. The software management system according to claim 1, wherein the restriction portion restricts an operation of a function of software determined, by the update necessity determination portion, to be required to be updated, among a plurality of functions included in the automatic driving function or the driving support function.

6. The software management system according to claim 1, further comprising:
    an analysis portion configured to analyze a status until the update is permitted by the user after the update necessity determination portion determines that the update is required.

7. A software management system for a vehicle having an automatic driving function or a driving support function, the software management system including a management server that manages software installed in the vehicle, the software management system comprising:
- an update necessity determination portion configured to determine whether or not an update is required in terms of software installed in the vehicle and related to the automatic driving function or the driving support function; and
- a restriction portion configured to:
  - turn on a control flag when the update is not permitted by a user and the update necessity determination portion determines that the update is required, the control flag enabling a restriction on an operation of part or all of the automatic driving function or the driving support function; and
  - start to restrict the operation of part or all of the automatic driving function or the driving support function at a timing when the vehicle enters an IG-ON state when the control flag is turned on and then the vehicle enters an IG-OFF state.

8. A management server communicably connected to a vehicle having an automatic driving function or a driving support function and configured to manage software installed in the vehicle, the management server comprising:
- an update necessity determination portion configured to determine whether or not an update is required in terms of software installed in the vehicle and related to the automatic driving function or the driving support function;
- a receiving portion configured to receive an update completion notice from the vehicle when the software related to the automatic driving function or the driving support function is updated because the update necessity determination portion determines that the update is required and a user permits the update; and
- a controlling portion, configured to:
  - when the update necessity determination portion determines that the update is required, transmit, to the vehicle, an instruction to turn on a control flag enabling a restriction on an operation of part or all of the automatic driving function or the driving support function at a timing when the vehicle enters an IG-ON state when the control flag is turned on and then the vehicle enters an IG-OFF state; and
  - when the receiving portion receives the update completion notice, transmit, to the vehicle, an instruction to turn off the control flag.

9. A management server communicably connected to a vehicle having an automatic driving function or a driving support function and configured to manage software installed in the vehicle, the management server comprising:
- an update necessity determination portion configured to determine whether or not an update is required in terms of software installed in the vehicle and related to the automatic driving function or the driving support function; and
- a controlling portion configured to transmit, to the vehicle, an instruction to turn on a control flag enabling a restriction on an operation of part or all of the automatic driving function or the driving support function at a timing when the vehicle enters an IG-ON state when the control flag is turned on and then the vehicle enters an IG-OFF state, in a case where the update necessity determination portion determines that the update is required, but the update is not permitted by a user.

10. A vehicle having an automatic driving function or a driving support function and communicably connected to a management server, the vehicle comprising:
- an update portion configured to update software related to the automatic driving function or the driving support function when it is determined that an update is required in terms of software installed in the vehicle and related to the automatic driving function or the driving support function and the update is permitted by a user;
- a restriction portion configured to:
  - turn on a control flag when it is determined that the update is required in terms of the software installed in the vehicle and related to the automatic driving function or the driving support function, the control flag enabling a restriction on an operation of part or all of the automatic driving function or the driving support function;
  - turn off the control flag when the update portion updates the software related to the automatic driving function or the driving support function;
  - start to restrict the operation of part or all of the automatic driving function or the driving support function at a timing when the vehicle enters an IG-ON state when the control flag is turned on and then the vehicle enters an IG-OFF state; and
  - reset the restriction at a timing when the control flag is turned off.

11. A vehicle having an automatic driving function or a driving support function and communicably connected to a management server, the vehicle comprising:
- an update necessity determination portion configured to determine whether or not an update is required in terms of software installed in the vehicle and related to the automatic driving function or the driving support function; and
- a restriction portion configured to:
  - turn on a control flag when the update is not permitted by a user and the update necessity determination portion determines that the update is required, the control flag enabling a restriction on an operation of part or all of the automatic driving function or the driving support function; and
  - start to restrict an operation of part or all of the automatic driving function or the driving support function at a timing when the vehicle enters an IG-ON state when the control flag is turned on and then the vehicle enters an IG-OFF state.

* * * * *